United States Patent
Takamatsu et al.

(10) Patent No.: US 9,906,133 B2
(45) Date of Patent: Feb. 27, 2018

(54) ELECTRIC SOURCE CONTROL APPARATUS

(71) Applicant: TOYOTA JIDOSHA KABUSHIKI KAISHA, Toyota-shi, Aichi-ken (JP)

(72) Inventors: Naoyoshi Takamatsu, Shizuoka-ken (JP); Masaki Okamura, Toyota (JP); Shuji Tomura, Nagakute (JP); Masanori Ishigaki, Nagakute (JP); Naoki Yanagizawa, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/508,338

(22) PCT Filed: Jul. 22, 2015

(86) PCT No.: PCT/JP2015/070826
§ 371 (c)(1),
(2) Date: Mar. 2, 2017

(87) PCT Pub. No.: WO2016/035467
PCT Pub. Date: Mar. 10, 2016

(65) Prior Publication Data
US 2017/0288547 A1    Oct. 5, 2017

(30) Foreign Application Priority Data
Sep. 4, 2014    (JP) ................. 2014-180134

(51) Int. Cl.
*H02M 1/088* (2006.01)
*H02M 3/158* (2006.01)
(Continued)

(52) U.S. Cl.
CPC ......... *H02M 3/158* (2013.01); *B60L 11/1803* (2013.01); *H02M 1/32* (2013.01); *H02M 2001/327* (2013.01); *H02P 27/08* (2013.01)

(58) Field of Classification Search
CPC ... H02M 2001/0067; H02M 2001/007; H02M 1/088; H02M 3/158
(Continued)

(56) References Cited

U.S. PATENT DOCUMENTS

2014/0145694 A1    5/2014  Ishigaki et al.
2014/0152089 A1    6/2014  Manabe et al.
(Continued)

FOREIGN PATENT DOCUMENTS

JP    2000-295715 A    10/2000
JP    2011-135673 A    7/2011
(Continued)

*Primary Examiner* — Jeffrey Sterrett
(74) *Attorney, Agent, or Firm* — Andrews Kurth Kenyon LLP

(57) ABSTRACT

An electric source control apparatus has: a determining device for determining whether a converter operates in a first mode or a second mode, wherein the first mode prioritizes increase of efficiency of the electric power conversion than the second mode does and the second mode prioritizes suppression of increase of element temperature of the switching element than the first mode does; and a controlling device for controlling the converter so that (i) a switching pattern becomes a first pattern, if the converter operates in the first mode and (ii) the switching pattern becomes a second pattern, if the converter operates in the second mode, wherein the first pattern is capable of increasing the efficiency of the electric power conversion more than the second pattern is and the second pattern is capable of suppressing the increase of the element temperature more than the first pattern is.

11 Claims, 14 Drawing Sheets

(51) Int. Cl.
  *B60L 11/18*    (2006.01)
  *H02M 1/32*    (2007.01)
  *H02P 27/08*    (2006.01)

(58) Field of Classification Search
  USPC ............................... 323/266, 271, 350, 351
  See application file for complete search history.

(56) References Cited

U.S. PATENT DOCUMENTS

2016/0315479 A1* 10/2016 Ide ..................... H02M 3/158
2017/0288547 A1* 10/2017 Takamatsu ............ H02M 3/158

FOREIGN PATENT DOCUMENTS

JP    2013-013234 A    1/2013
WO    2013/005295 A1    1/2013

* cited by examiner

[FIG. 1]
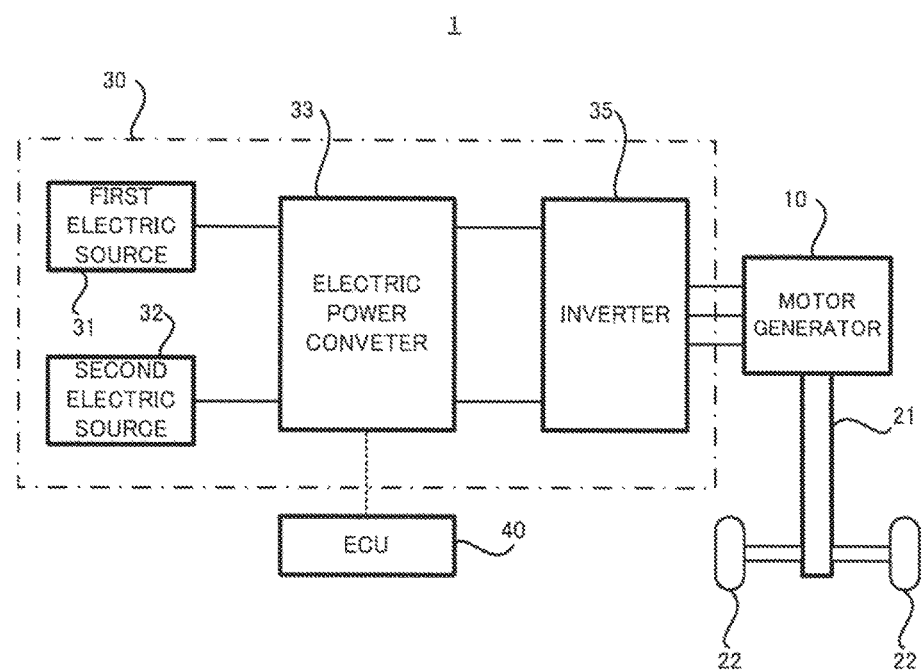

[FIG. 2]
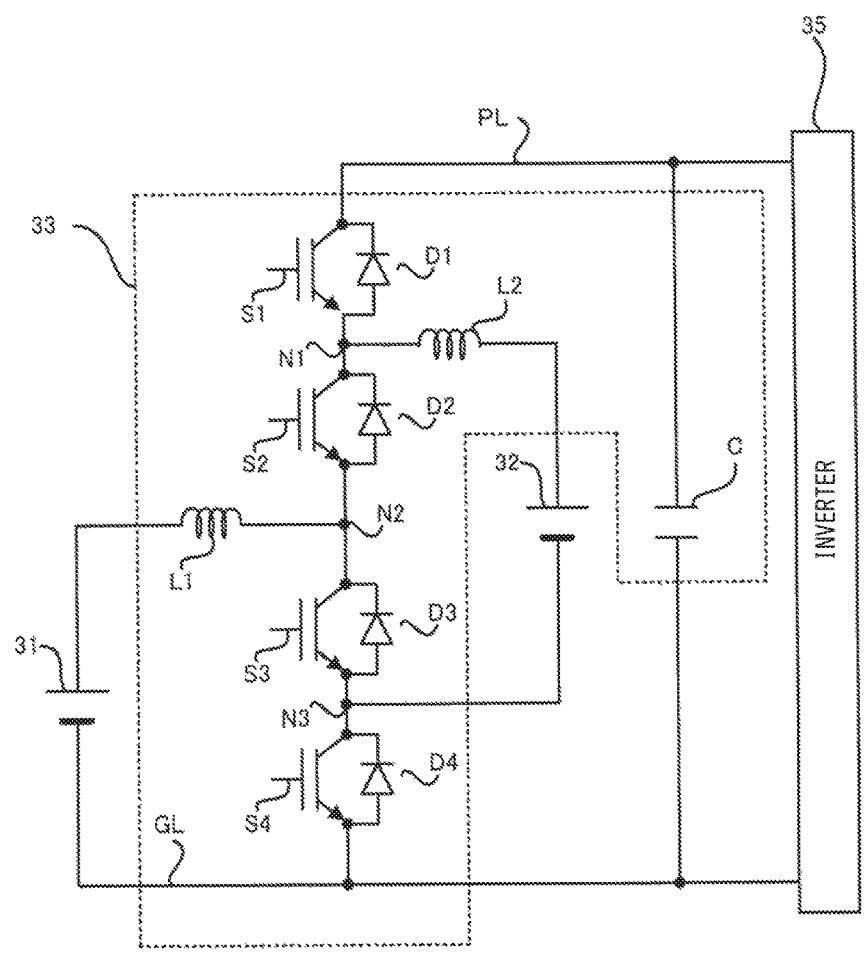

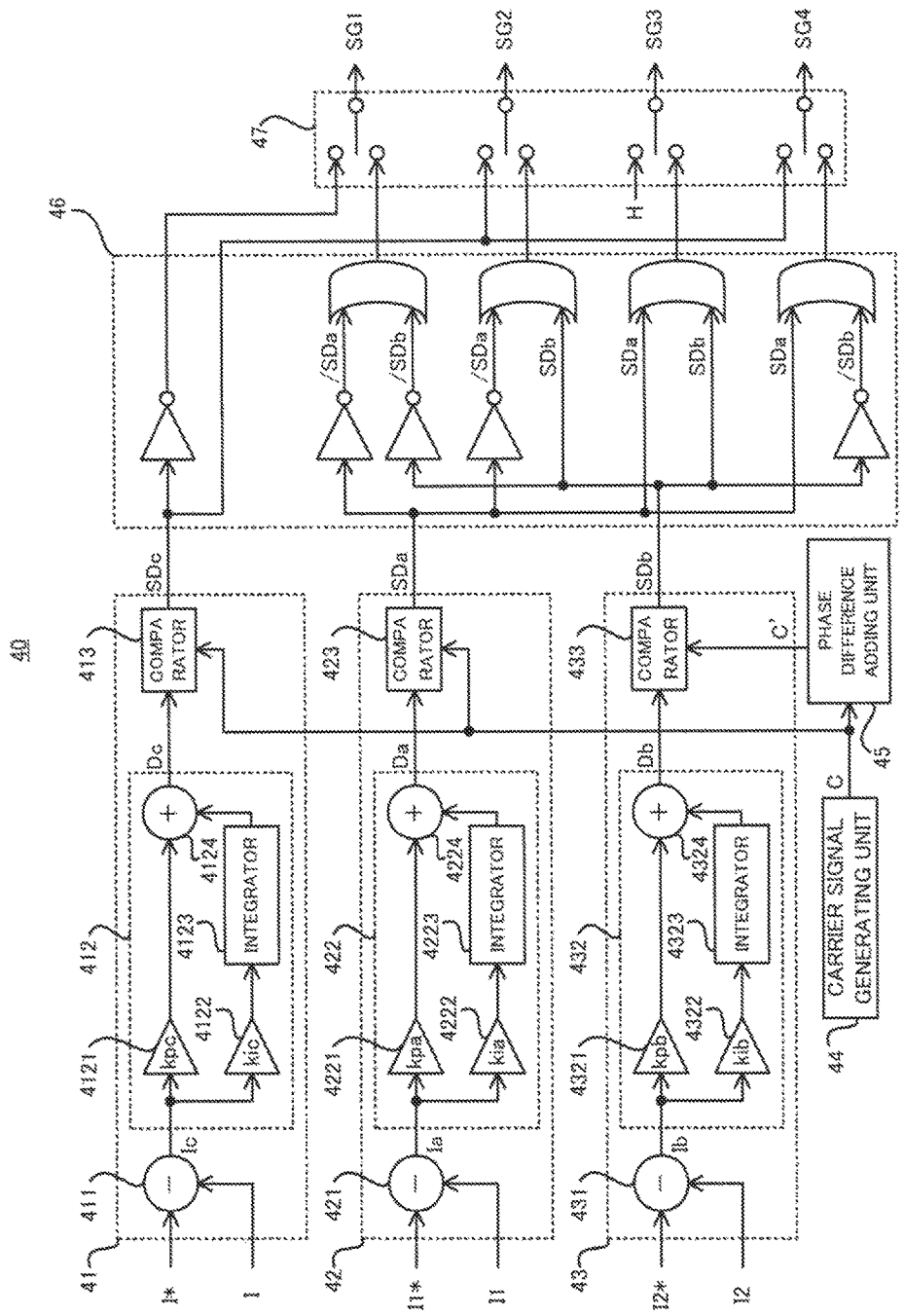
[FIG. 3]

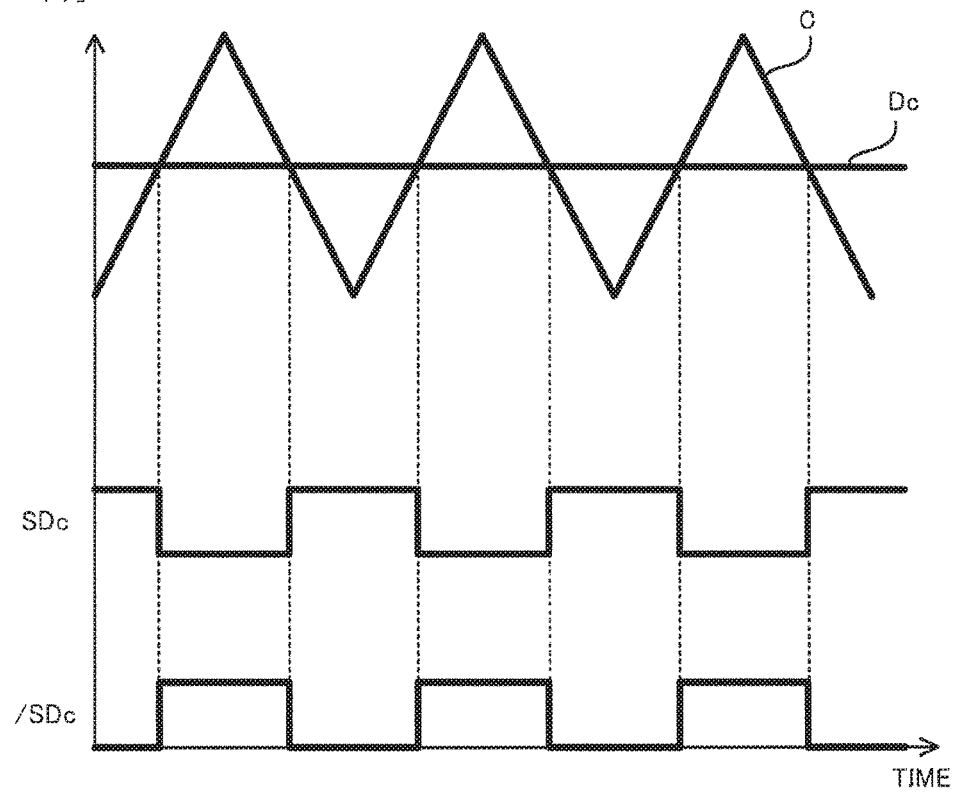

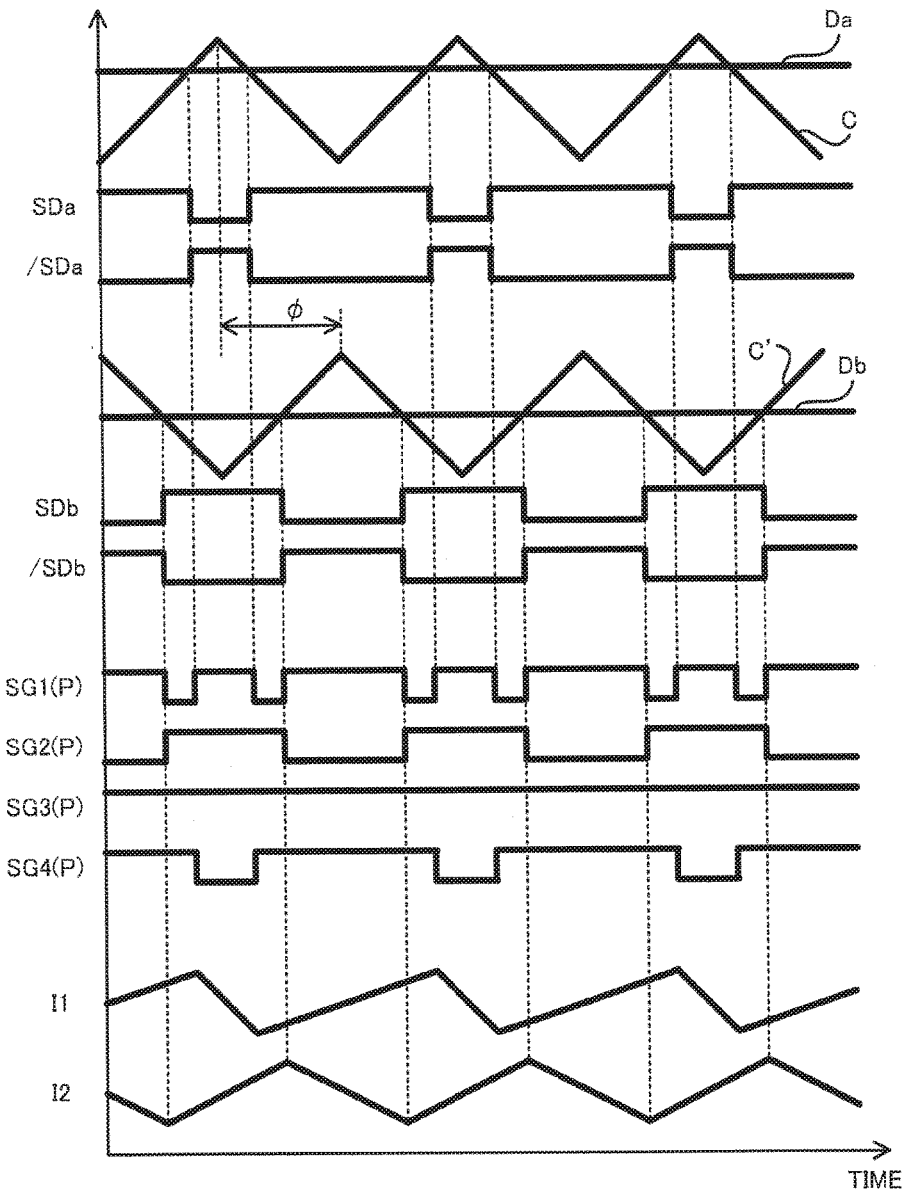

[FIG. 6]
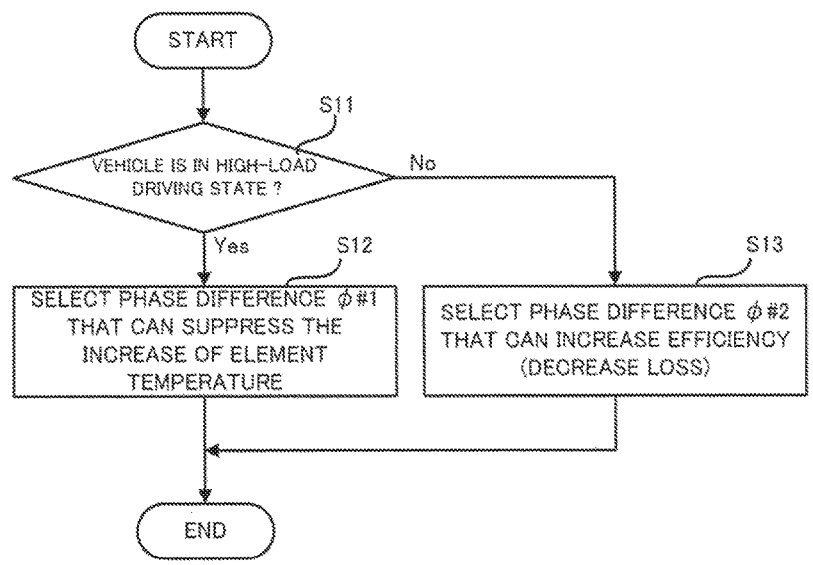

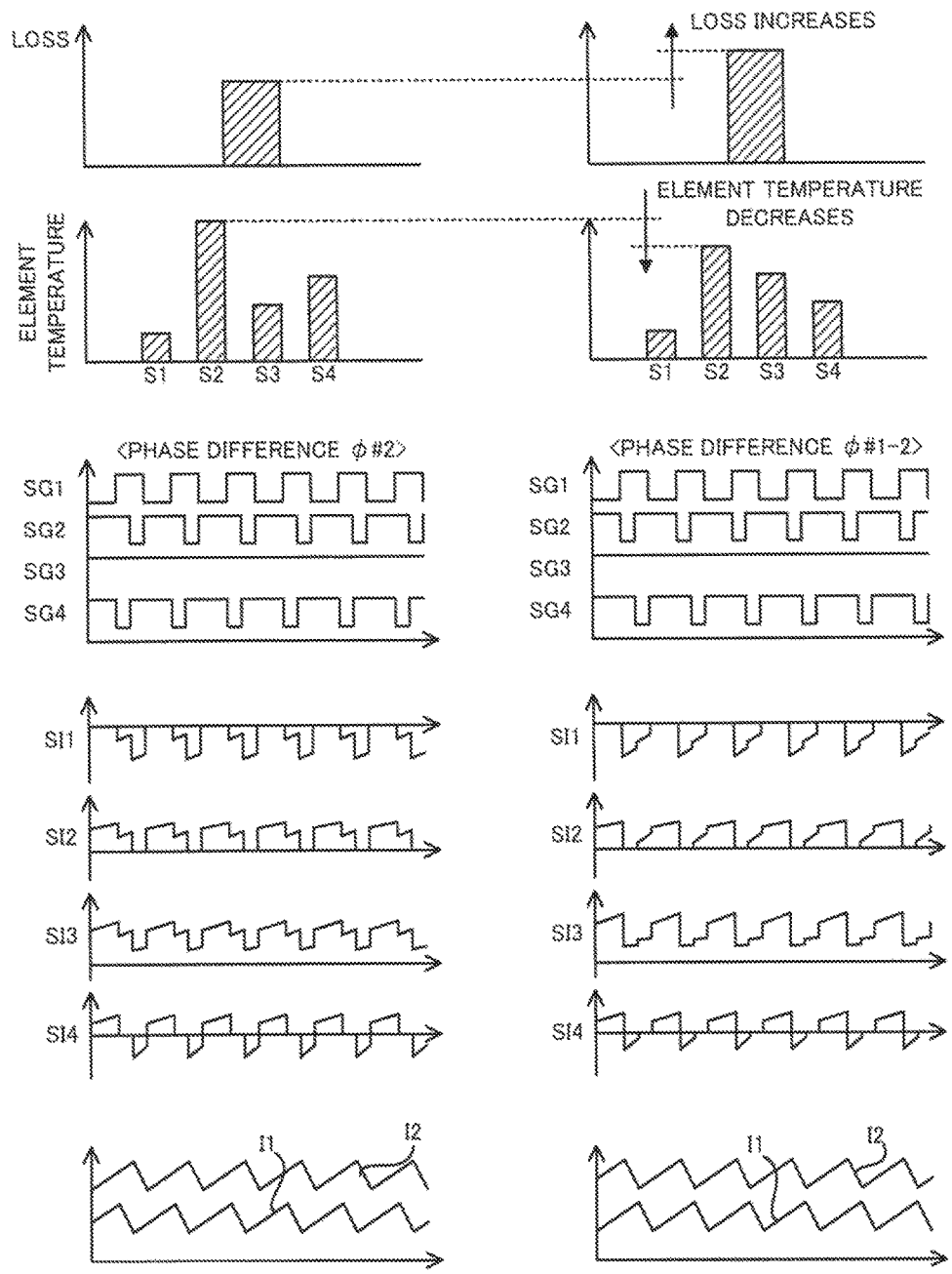
[FIG. 7]

[FIG. 8]
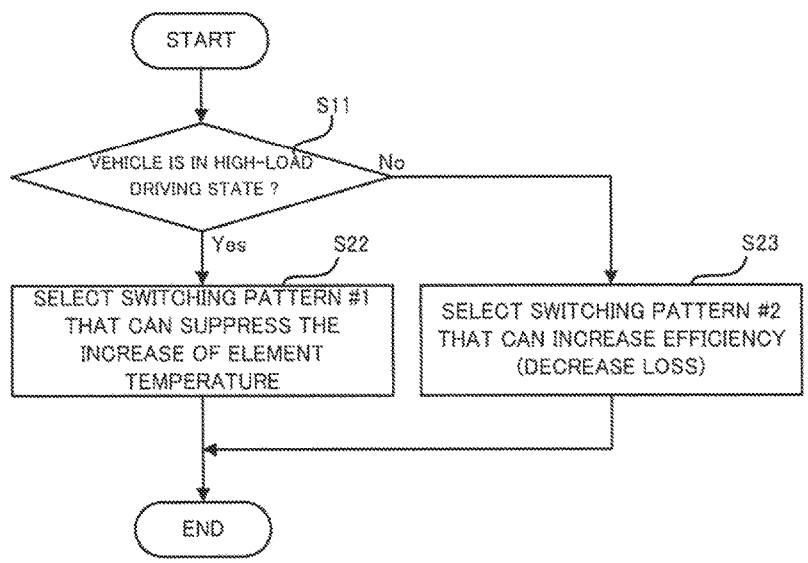

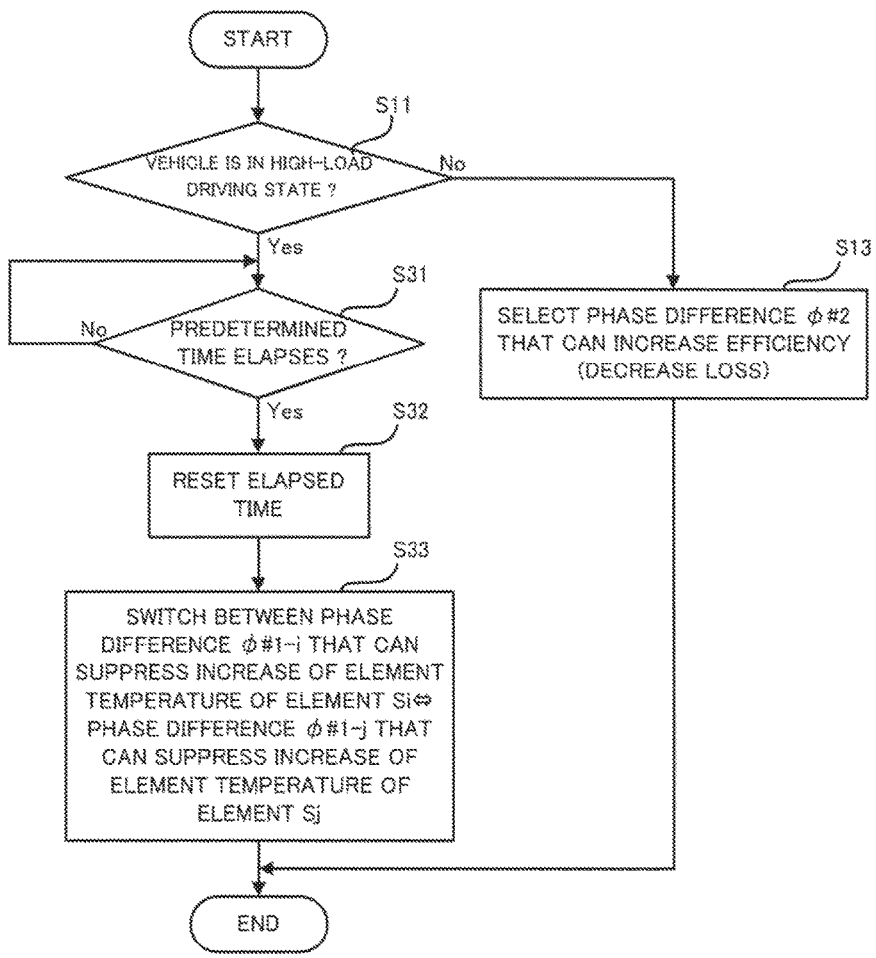
[FIG. 9]

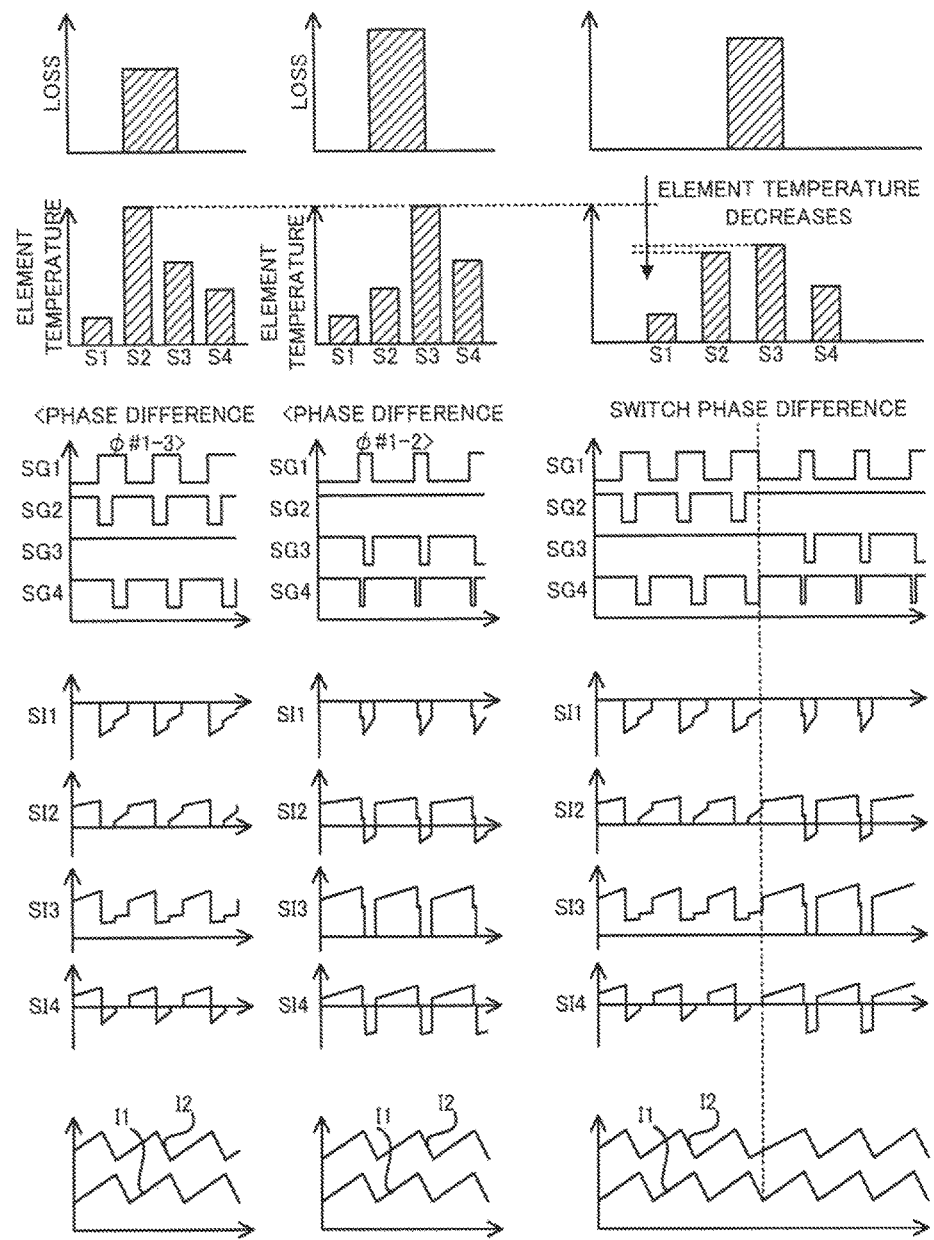
[FIG. 10]

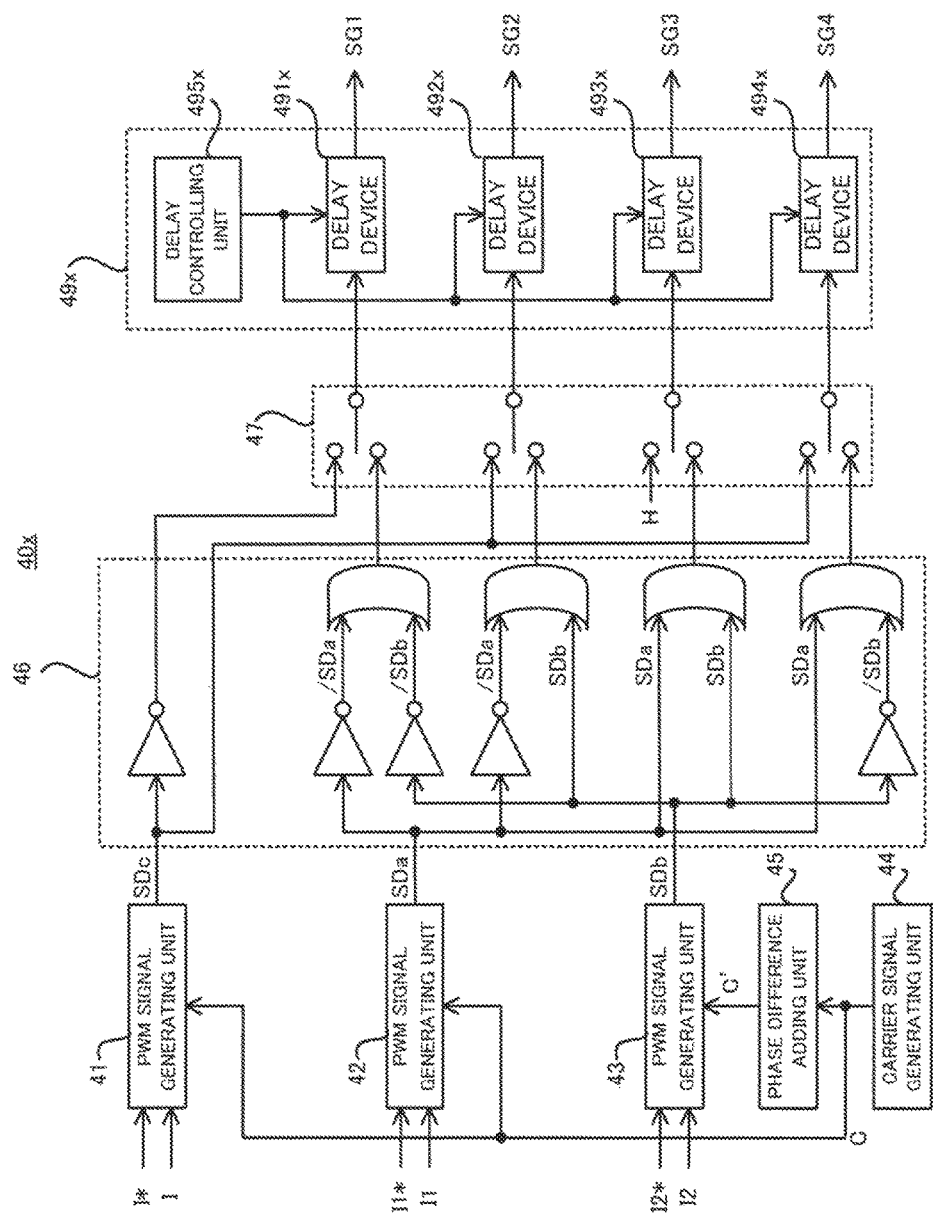

[FIG. 12]
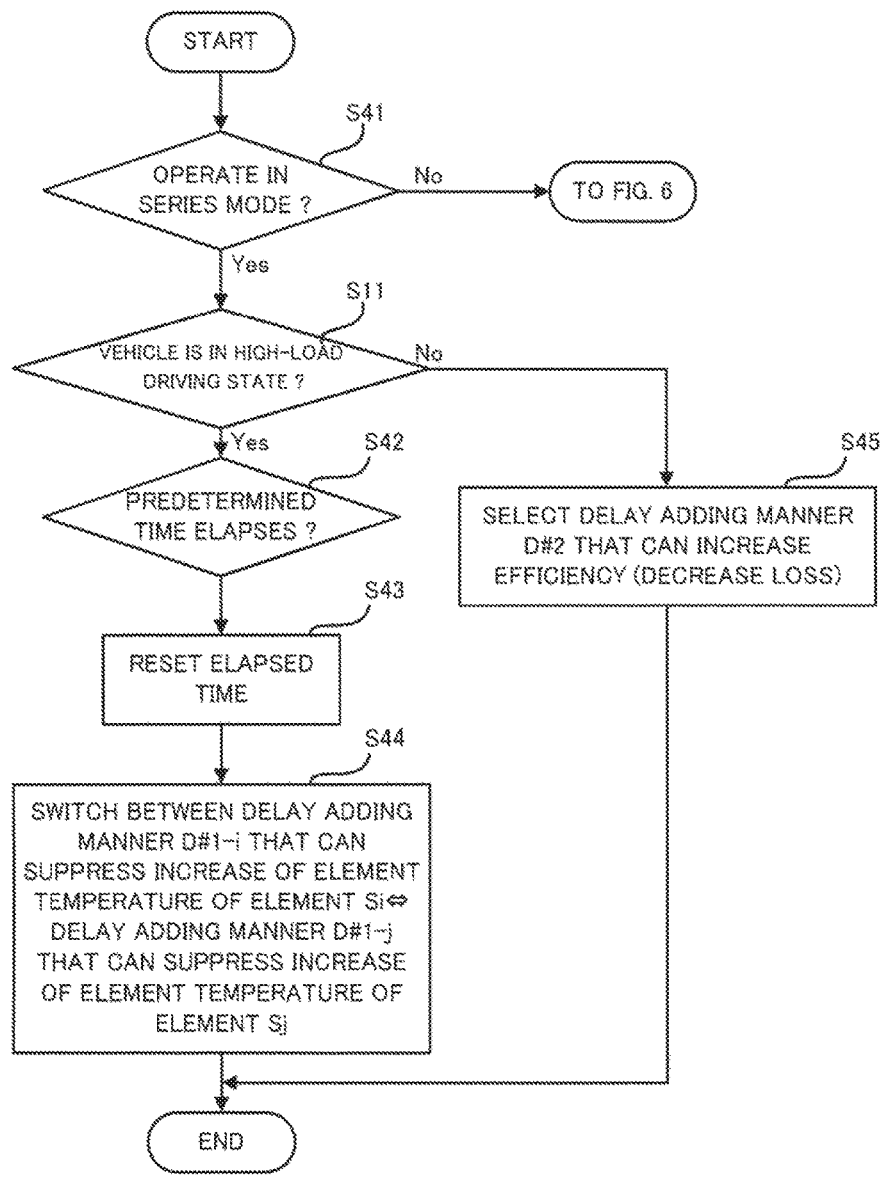

[FIG. 13]
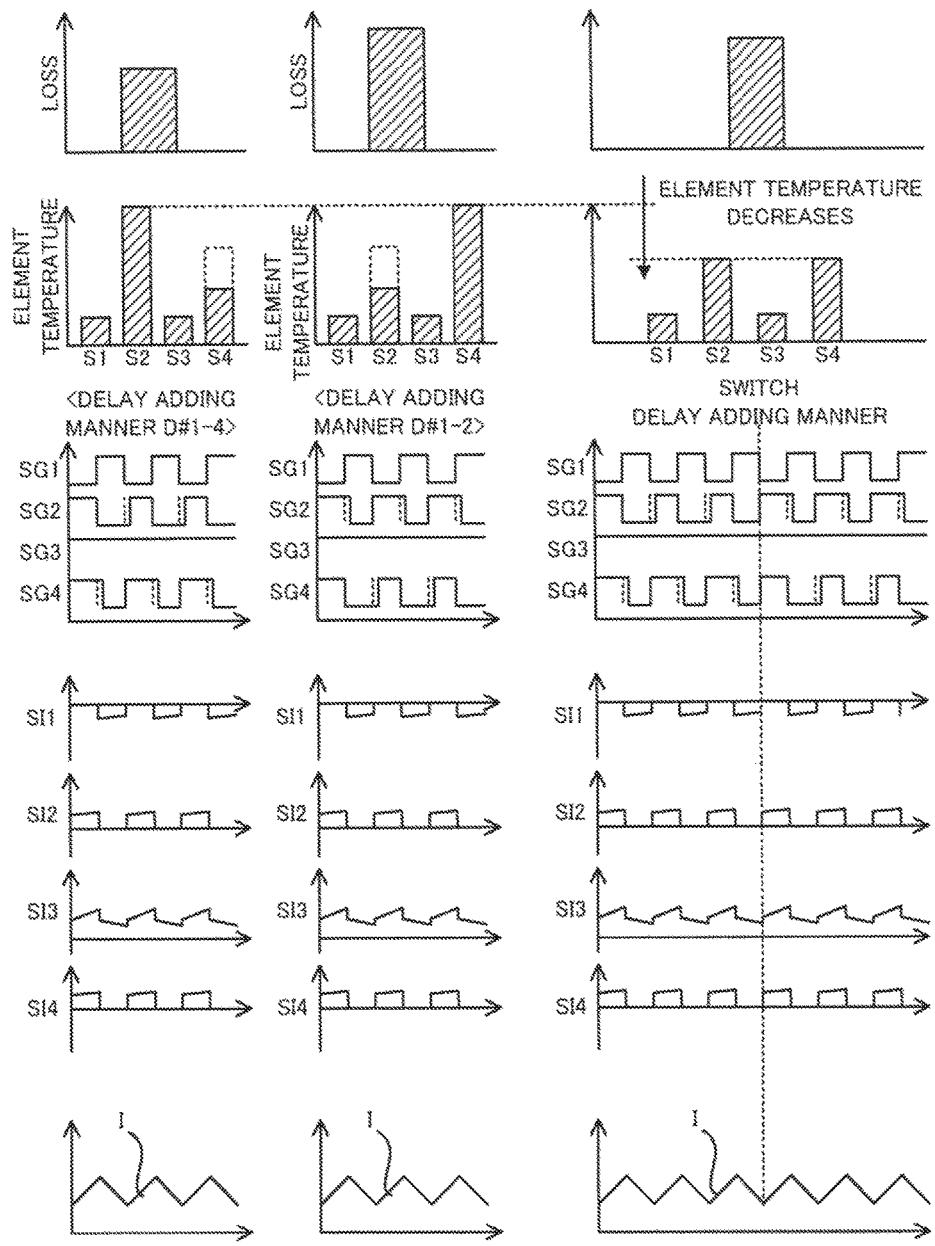

[FIG. 14(a)]
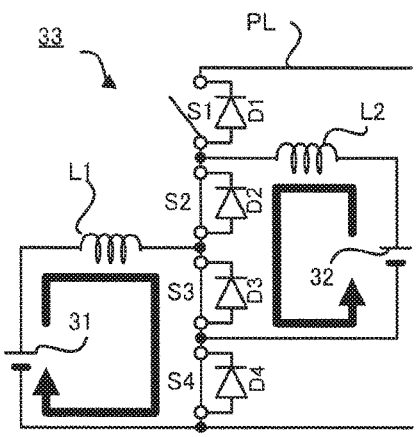
[FIG. 14(b)]
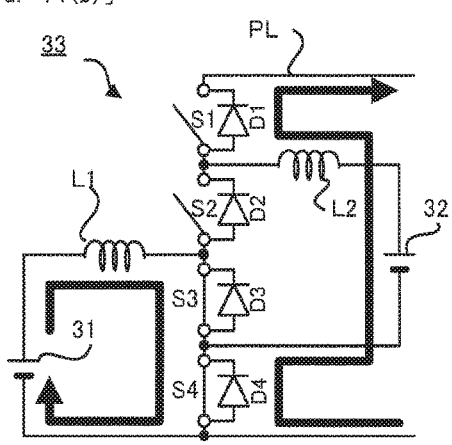
[FIG. 14(c)]
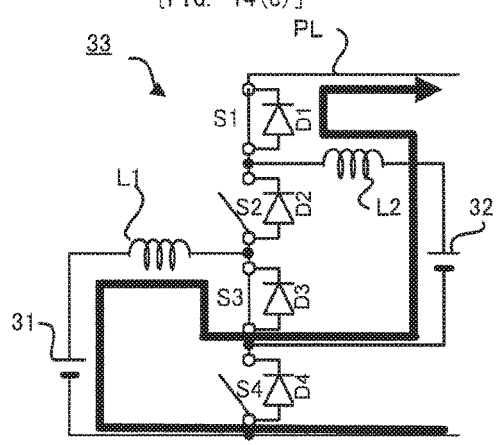
[FIG. 14(d)]
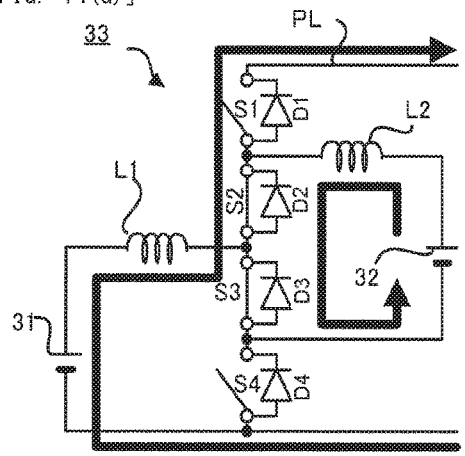

ELECTRIC SOURCE CONTROL APPARATUS

CROSS-REFERENCE TO RELATED APPLICATIONS

This is a national phase application based on the PCT International Patent Application No. PCT/JP2015/070826 filed Jul. 22, 2015, claiming priority to Japanese Patent Application No. 2014-180134 filed Sep. 4, 2014, the entire contents of both of which are incorporated herein by reference.

TECHNICAL FIELD

The present invention relates to an electric source control apparatus for controlling an electric source system having an electric power converter that is configured to perform an electric power conversion with as electricity storage apparatus, for example.

BACKGROUND ART

An electric source system that is provided with: an electricity storage apparatus such as a secondary battery and a capacitor; and an electric power converter that is configured to perform an electric power conversion with the electricity storage apparatus by changing switching state of switching element, is known. For example, a Patent Literature 1 and a Patent Literature 2 disclose an electric source that is configured to perform the electric power conversion by changing the switching state of the switching element so that an efficiency of the electric power conversion in the entire electric source system can be increased (namely, a loss of an electric power can be reduced).

Moreover, a Patent Literature 3 and Patent Literature 4 are listed as background art documents that are related to the present invention.

CITATION LIST

Patent Literature

Patent Literature 1: Japanese Unexamined Patent Application Publication No. 2000-295715
Patent Literature 2: Japanese Unexamined Patent Application Publication No. 2013-013234
Patent Literature 3: Japanese Unexamined Patent Application Publication No. 2011-135673
Patent Literature 4: International Publication No. 2013/005295

SUMMARY OF INVENTION

Technical Problem

In the electric source system disclosed in above described Patent Literatures 1 and 2, a switching pattern of the switching element (namely, a changing aspect of the switching state over time) is fixed to a specific switching pattern that is determined from a viewpoint of increasing the efficiency of the electric power conversion. As a result, there is a possibility that an element temperature of the specific switching element increases excessively. However, the electric source system disclosed in above described Patent Literatures 1 and 2 is not allowed to change (in other words, switch) the switching pattern in order to achieve a purpose that is different from a purpose of increasing the efficiency of the electric power conversion. Therefore, the electric source system disclosed in above described Patent Literatures 1 and 2 it not capable of changing (in other words, switching) the switching pattern in order to suppress the excessive increase of the element temperature of the switching element.

The above described problem is one example of the problem to be solved by the present invention. It is therefore an object of the present invention to provide an electric source control apparatus that is capable of suppressing the increase of the element temperature of the switching element while increasing the efficiency of the electric power conversion.

Solution to Problem

<1>

An electric source system of the present invention is configured to control an electric source system, the electric source system has: (i) an electricity storage apparatus; and (ii) an electric power converter that has a switching element and that is configured to perform an electric power conversion with the electricity storage apparatus by changing switching state of the switching element, the electric source control apparatus is provided with: a determining device that is configured to determine whether the electric power converter operates in a first mode or a second mode, wherein the first mode prioritizes an increase of an efficiency of the electric power conversion than the second mode does and the second mode prioritizes a suppression of an increase of element temperature of the switching element than the first mode does; and a controlling device that is configured to control the electric power converter so that (i) a switching pattern of the switching element becomes a first pattern, if it is determined that the electric power converter operates in the first mode and (ii) the switching pattern of the switching element becomes a second pattern. If it is determined that the electric power converter operates in the second mode, wherein the first pattern is capable of increasing the efficiency of the electric power conversion more than the second pattern is and the second pattern is capable of suppressing the increase of the element temperature more than the first pattern is.

According to the electric source control apparatus of the present invention, the electric source system having the electricity storage apparatus and the electric power converter can be controlled. Specifically, the electric power converter is capable of changing the switching state of the switching element included in the electric power converter, under the control of the electric source control apparatus. For example, the electric power converter is capable of changing the switching state of the switching element from an OFF state to an ON state or from the ON state to the OFF state, under the control of the electric source control apparatus. As a result, the electric power converter is capable of performing the electric power conversion with the electricity storage apparatus.

Especially in the present invention, the electric source control apparatus has the determining device and the controlling device in order to control the electric source system having the electricity storage apparatus and the electric power converter.

The determining device is configured to determine whether the electric power converter operates in the first mode or the second mode.

The first mode is an operation mode in which the electric power converter operates so as to prioritize the increase of the efficiency of the electric power conversion, compared to the second mode. Therefore, the electric power converter operating in the first mode operates so as to prioritize the increase of the efficiency of the electric power conversion more than the electric power converter operating in the second mode. As a result, the efficiency of the electric power conversion is increased in the case where the electric power converter operates in the first mode, compared to the case where the electric power converter operates in the second mode.

The second mode is an operation mode in which the electric power converter operates so as to prioritize the suppression of the increase of the element temperature of the switching element, compared to the first mode. Therefore, the electric power converter operating in the second mode operates so as to prioritize the suppression of the increase of the element temperature more than the electric power converter operating in the first mode. As a result, the increase of the element temperature is suppressed in the case where the electric power converter operates in the second mode, compared to the case where the electric power converter operates in the first mode.

The controlling device is configured to control the electric power converter on the basis of a result of the determination of the determining device. Specifically, the controlling device is configured to control the electric power converter so that the switching pattern of the switching element (namely, a changing aspect of the switching state over time) becomes either one of the first pattern and the second pattern, on the basis of the result of the determination of the determining device.

If the determining device determines that the electric power converter operates in the first mode, the controlling device controls the electric power converter so that the switching pattern becomes the first pattern. The first pattern is a switching pattern that is capable of increasing the efficiency of the electric power conversion more than the second pattern. Therefore, the electric power converter operating to set the first pattern to the switching pattern operates so as to increase the efficiency of the electric power conversion more than the electric power converter operating to set the second pattern to the switching pattern. As a result, the efficiency of the electric power conversion is increased in the case where the electric power converter operates to set the first pattern to the switching pattern, compared to the case where the electric power converter operates to set the second pattern to the switching pattern.

If the determining device determines that the electric power converter operates in the second mode, the controlling device controls the electric power converter so that the switching pattern becomes the second pattern. The second pattern is a switching pattern that is capable of suppressing the increase of the element temperature (typically, is capable of decreasing or not increasing the element temperature) more than the first pattern. Therefore, the electric power converter operating to set the second pattern to the switching pattern operates so as to suppress the increase of the element temperature more than the electric power converter operating to set the first pattern to the switching pattern. As a result, the increase of the element temperature is suppressed in the case where the electric power converter operates to set the second pattern to the switching pattern, compared to the case where the electric power converter operates to set the first pattern to the switching pattern.

As described above, the electric source control apparatus is capable of changing (namely, switching, same is true in the following description) the switching pattern so as to increase the efficiency of the electric power conversion under the situation where the increase of the efficiency of the electric power conversion should be prioritized. In a same manner, the electric source control apparatus is capable of changing the switching pattern so as to suppress the increase of the element temperature under the situation where the suppression of the increase of the element temperature should be prioritized. Namely, the electric source control apparatus is capable of changing the switching pattern in accordance with the condition of the electric source system. As a result, the electric source control apparatus is capable of controlling the electric source system to suppress the increase of the element temperature of the switching element while increasing the efficiency of the electric power conversion.

<2>

In another aspect of the electric source control apparatus of the present invention, the second pattern defines a second switching timing that is obtained by shifting, in a time axis direction, at least one portion of a first switching timing of the switching element that is defined by the first pattern.

According to this aspect, the controlling device is capable of changing the switching pattern relatively easily.

Note that the "switching timing" described here typically means at least one of a timing at which the switching element switches from the ON state to the OFF state and a timing at which the switching element switches from the OFF state to the ON state.

<3>

In another aspect of the electric source control apparatus of the present invention, the determining device is configured to determine on the basis of a load of the electric source system whether the electric power converter operates in the first mode or the second mode.

According to this aspect, the determining device is capable of appropriately determining whether the electric power converter operates in the first mode or the second mode.

<4>

In another aspect of the above described electric source control apparatus that is configured to determine on the basis of the load of the electric source system whether the electric power converter operates in the first mode or the second mode, the determining device is configured to determine that the electric power converter operates in the first mode if the load is smaller than a predetermined value, the determining device is configured to determine that the electric power converter operates in the second mode if the load is equal to or larger than the predetermined value.

According to this aspect, the determining device is allowed to determine that the electric power converter operates in the first mode that prioritizes the increase of the efficiency of the electric power conversion, because there is relatively low possibility that the element temperature increases excessively if the load of the electric source system is smaller than the predetermined value (namely, is relatively small). On the other hand, the determining device is allowed to determine that the electric power converter operates in the second mode that prioritizes the suppression of the increase of the element temperature, because there is relatively high possibility that the element temperature increases excessively if the load of the electric source system is equal to or larger than the predetermined value (namely, is relatively large). Therefore, the determining device is capable of appropriately determining whether the electric power converter operates in the first mode or the second mode.

<5>

In another aspect of the electric source control apparatus of the present invention, the electric power converter has a plurality of switching elements, the second mode is a mode that suppresses the increase of the element temperature of a first switching element among the plurality of switching elements.

According to this aspect, the electric source control apparatus is capable of controlling the electric source system to suppress the increase of the element temperature of the first switching element that is one of the plurality of switching elements while increasing the efficiency of the electric power conversion.

Note that there is a high possibility that a characteristics required for the electric source system is satisfied even when the switching pattern of at least one of the plurality of switching elements is changed, if the electric power converter has the plurality of switching elements. Therefore, it is preferable that the electric power converter have the plurality of switching elements, from a viewpoint of satisfying the characteristics required for the electric source system while changing the switching pattern so as to increase the efficiency of the electric power conversion and to suppress the increase of the element temperature of the switching element. More preferably, it is preferable that the electric power converter have three or more switching elements.

<6>

In another aspect of the electric source control apparatus in which the second mode is the mode that suppresses the increase of the element temperature of the first switching element, the first switching element is a switching element having highest element temperature among the plurality of switching elements.

According to this aspect, the electric source control apparatus is capable of controlling the electric source system to suppress the increase of the element temperature of the first switching element having the highest element temperature while increasing the efficiency of the electric power conversion.

<7>

In another aspect of the electric source control apparatus of the present invention, the electric power converter has a plurality of switching elements, the second mode is a mode that suppresses the increase of the element temperatures of at least a first switching element and a second switching element among the plurality of switching elements.

According to this aspect, the electric source control apparatus is capable of controlling the electric source system to suppress the increase of the element temperatures of the first and second switching elements that are at least two of the plurality of switching elements while increasing the efficiency of the electric power conversion.

In another aspect of the electric source control apparatus in which the second mode is the mode that suppresses the increase of the element temperatures of the first and second switching elements, the controlling device is configured to control the electric power converter so that the switching pattern is switched between a third pattern and a fourth pattern, if it is determined that the electric power converter operates in the second mode, wherein (i) the third pattern is one portion of the second pattern and is capable of suppressing the increase of the element temperature of the first switching element more than the first pattern is and (ii) the fourth pattern is one portion of the second pattern and is capable of suppressing the increase of the element temperature of the second switching element more than the first pattern is.

According to this aspect, the electric source control apparatus is capable of controlling the electric source system to suppress the increase of the element temperatures of the first and second switching elements that are at least two of the plurality of switching elements while increasing the efficiency of the electric power convention.

<9>

In another aspect of the electric source control apparatus in which the second mode is the mode that suppresses the increase of the element temperatures of the first and second switching elements, the first and second switching elements are switching elements having higher element temperatures than another switching element among the plurality of switching elements.

According to this aspect, the electric source control apparatus is capable of controlling the electric source system to suppress the increase of the element temperatures of the first and second switching elements having the relatively high element temperatures while increasing the efficiency of the electric power conversion.

<10>

In another aspect of the electric source control apparatus of the present invention, the electric source system has, as electricity storage apparatuses, at least a first electricity storage apparatus and a second electricity storage apparatus, (i) the electric power converter has a plurality of switching elements each of which is arranged to be included in both of a first electric power conversion path and a second electric power conversion path, wherein the first electric power conversion path is formed to pass through the first electricity storage apparatus to perform the electric power conversion with the first electricity storage apparatus and the second electric power conversion path is formed to pass through the second electricity storage apparatus to perform the electric power conversion with the second electricity storage apparatus, (ii) the electric power converter is capable of performing the electric power conversion in a state where the first electricity storage apparatus and the second electricity storage apparatus are electrically connected in parallel in the electric source system and in a state where the first electricity storage apparatus and the second electricity storage apparatus are electrically connected in series in the electric source system.

According to this aspect, the electric source control apparatus is capable of controlling the electric source system to suppress the increase of the element temperature of the switching element while increasing the efficiency of the electric power conversion, even if the electric source system has the plurality of electricity storage apparatuses and the electric power converter performs the electric power conversion in both of the state where the plurality of electricity storage apparatuses ore electrically connected in series and the state where the plurality of electricity storage apparatuses are electrically connected in parallel.

<11>

In another aspect of the electric source control apparatus in which the electric power converter performs the electric power conversion in the state where the first electricity storage apparatus and the second electricity storage apparatus are electrically connected in series and in the state where the first electricity storage apparatus and the second electricity storage apparatus are electrically connected in parallel, the controlling device is configured (i) to adjust a phase difference between a first carrier signal that is used by a first pulse width modulation control for controlling the electric power conversion in the first electric power path and a second carrier signal that is used by a second pulse width modulation control for controlling the electric power conversion in the second electric power path and (ii) to control the electric power converter be that the switching element is switched on the basis of a control signal that is obtained by the first pulse width modulation control and the second pulse width modulation control, the controlling device is configured to adjust the phase difference so that the phase difference when it is determined that the electric power converter operates in the first mode is different from the phase difference when it is determined that the electric power converter operates in the second mode.

According to this aspect, the controlling device is capable of controlling the electric power converter by using the control signal that is obtained by the first pulse width modulation control based on the first carrier signal and the second pulse width modulation control based on the second carrier signal. Especially, the controlling device is capable of changing the switching pattern by adjusting the difference between the phase of the first carrier signal and the phase of the second carrier signal (namely, the phase difference).

An operation and another advantage of the present invention will become more apparent from the embodiments explained below.

BRIEF DESCRIPTION OF DRAWINGS

FIG. 1 is a block diagram illustrating one example of an entire structure of a vehicle in a first embodiment.

FIG. 2 is a circuit diagram illustrating one example of a circuit structure of an electric power converter.

FIG. 3 is a block diagram illustrating one example of a structure of an ECU.

FIG. 4(*a*) and FIG. 4(*b*) are waveform drawing and table illustrating various signals that are generated by the ECU when the electrical power converter performs the electric power conversion in the series connecting mode.

FIG. 5(*a*) and FIG. 5(*b*) are waveform drawing and table illustrating various signals that are generated by the ECU when the electrical power converter performs the electric power conversion in the parallel connecting mode.

FIG. 6 is a flowchart illustrating one example of the flow of the operation of the ECU (especially, the operation of changing the phase difference that is added to the carrier signal).

FIG. 7 is a graph illustrating the loss of the electric source system, the element temperatures of the switching elements, the control signals, element currents that flow through the switching elements and the reactor current signals before and after the phase difference is changed.

FIG. 8 is a flowchart illustrating one example of the flow of the operation of the ECU in the second embodiment.

FIG. 9 is a flowchart illustrating one example of the flow of the operation of the ECU in the third embodiment.

FIG. 10 is a graph illustrating the loss of the electric source system, the element temperatures of the switching elements, the control signals, the element currents that flow through the switching elements and the reactor current signals before and after the phase difference is switched.

FIG. 11 is a block diagram illustrating one example of a structure of an ECU in the fourth embodiment.

FIG. 12 is a flowchart illustrating one example of the flow of the operation (especially, an operation of adding the delay) of the ECU.

FIG. 13 is a graph illustrating the loss of the electric source system, the element temperatures of the switching elements, the control signals, the element currents that flow through the switching elements and the reactor current signals before and after the delay adding manner is switched.

FIG. 14(*a*) to FIG. 14(*d*) are circuit diagrams illustrating an electric current that flows through the electric power converter when the delay adding manner is selected.

DESCRIPTION OF EMBODIMENT

Hereinafter, an embodiment of the electric source control apparatus of the present invention will be described. Note that, in the following explanation, an embodiment in which the electric source control apparatus of the present invention is applied to a vehicle (especially, a vehicle that is configured to move by using an electric power outputted from the electricity storage apparatus) will be described us one example. However, the electric source control apparatus may be applied to any equipment other than the vehicle.

(1) First Embodiment

With reference to FIG. 1 to FIG. 7, a vehicle 1 in a first embodiment will be described below.

(1-1) Structure of Vehicle 1

Firstly, with reference to FIG. 1 to FIG. 3, the structure of the vehicle 1 to the first embodiment will be described. Note that, in the following description, entire structure of the vehicle 1 is described, and then a detailed structure of each component (especially, an electric power converter 33 and an ECU 40) of the vehicle 1 will be described.

(1-1-1) Entire Structure of Vehicle 1

Firstly, with reference to FIG. 1, one example of the entire structure of the vehicle 1 will be described. Here, FIG. 1 is a block diagram illustrating one example of the entire structure of the vehicle 1 in the first embodiment.

As illustrated in FIG. 1, the vehicle 1 has a motor generator 10, an axle shaft 21, wheels 22, an electric source system 30 and an ECU 40 that is one specific example of the "electric source control apparatus".

The motor generator 10 mainly operates by using an electric power outputted from the electric source system 30 to serve as a motor for supplying a power (namely, a power which is required for the vehicle 1 to move) 10 the axle shaft 21, when the vehicle 1 is in a power running state. The power that is transmitted to the axle shaft 21 becomes a power for moving the vehicle 1 through the wheels 22. Furthermore, the motor generator 10 mainly serves as a generator for charging a first electric source 31 and a second electric source 32 in the electric source system 30, when the vehicle 1 is in a regeneration state.

Note that the vehicle 1 may have two or more motor generators 10. Furthermore, the vehicle 1 may have an engine in addition to the motor generator 10.

The electric source system 30 outputs the electric power, which is required for the motor generator 10 to serve as the motor, to the motor generator 10, when the vehicle 1 is in the power running state. Furthermore, the electric power which is generated by the motor generator 10 serving as the generator is inputted from the motor generator 10 to the electric source system 30, when the vehicle 1 is in the regeneration state.

This electric source system 30 has the first electric source 31 that is one specific example of the "electricity storage apparatus", the second electric source 32 that is one specific example of the "electricity storage apparatus", the electric power converter 33 and an inverter 35.

Each of the first electric source 31 and the second electric source 32 is an electric source which is capable of outputting the electric power (namely, discharging). Each of the first electric source 31 and the second electric source 32 is an electric source to which the electric power can be inputted (namely, which can be charged), in addition to be capable of outputting the electric power. At least one of the first electric source 31 and the second electric source 32 may be a lead battery, a lithium-ion battery, a nickel-hydrogen battery, a fuel battery, an electric double layer capacitor or the like, for example.

The electric power converter 33 converts the electric power that is outputted from the first electric source 31 and the electric power that is outputted from the second electric source 32 depending on a required electric power that is required for the electric source system 30 (in this case, an electric power which the electric source system 30 should output to the motor generator 10, for example), under the control of the ECU 40. The electric power converter 33 outputs the convened electric power to the inverter 35. Furthermore, the electric power converter 33 converts the electric power that is inputted from the inverter 35 (namely, the electric power that is generated by the regeneration of the motor generator 10) depending on the required electric power that is required for the electric source system 30 (in this case, an electric power that should be inputted to the electric source system 30, and, substantially, an electric power that should be inputted to the first electric source 31 and the second electric source 32, for example), under the control of the ECU 40. The electric power converter 33 outputs the converted electric power to at least one of the first electric source 31 and the second electric source 32. The above described electric power conversion allows the electric power converter 33 to distribute the electric power among the first electric source 31, the second electric source 32 and the inverter 35.

The inverter 35 converts the electric power (DC (direct current) electric power) that has been outputted from the electric power converter 33 to an AC (alternating current) electric power, when the vehicle 1 is in the power running state. Then, the inverter 35 supplies the electric power that has been converted to the AC electric power to the motor generator 10. Furthermore, the inverter 35 converts the electric power (AC electric power) that has been generated by the motor generator 10 to the DC electric power. Then, the inverter 35 supplies the electric power that has been converted to the DC electric power, to the electric power converter 33.

The ECU 40 is an electric controlling unit that is configured to control the whole of the operation of the vehicle 1. Especially in the first embodiment, the ECU 40 is capable of controlling the operation of the electric source system 30.

Note that the above described entire structure of the vehicle 1 is merely one example. Therefore, at least one portion of the structure of the vehicle 1 may be modified appropriately. For example, the vehicle 1 may have one electric source. The vehicle 1 may have three or more electric sources.

(1-1-2) Structure of Electric Power Converter 33

Next, with reference to FIG. 2, one example of the structure of the electric power converter 33 will be described. FIG. 2 is a circuit diagram illustrating one example of the structure of the electric power converter 33.

As illustrated in FIG. 2, the electric power converter 33 has a switching element S1, a switching element S2, a switching element S3, a switching element S4, a diode D1, a diode D2, a diode D3, a diode D4, a reactor L1, a reactor L2 and a smoothing capacitor C.

The switching element S1 is capable of switching depending on a control signal that is outputted from the ECU 40. Namely, the switching element S1 is capable of changing the switching state thereof from an ON state to an OFF state or from the OFF state to the ON state depending on the control signal that is outputted from the PCU 36. An IGBT (Insulated Gate Bipolar Transistor), a MOS (Metal Oxide Semiconductor) transistor for the electric power or a bipolar transistor for (be electric power is used as the switching element S1, for example. The above description on the switching element S1 can be applied to the switching element S2, the switching element S3 and the switching element S4.

The switching element S1, the switching element S2, the switching element S3 and the switching element S4 are electrically connected in series between an electric source line PL and a ground line GL that are electrically connected to the motor generator 10 via the inverter 33. Specifically, the switching element S1 is electrically connected between the electric source line PL and a node N1. The switching element S2 is electrically connected between the node N1 and a node N2. The switching element S3 is electrically connected between the node N2 and a node N3. The switching element S4 is electrically connected between the node N3 and the ground line GL.

The diode D1 is electrically connected in parallel to the switching element S1. The diode D2 is electrically connected in parallel to the switching element S2. The diode D3 is electrically connected in parallel to the switching element S3. The diode D4 is electrically connected in parallel to the switching element S4. Note that the diode D1 is connected in an inverse-parallel manner to the switching element S1. Same argument can be applied to the diode D2 to the diode D4.

The reactor L1 is electrically connected between a positive terminal of the first electric source 31 and the node N2. The reactor L2 is electrically connected between a positive terminal of the second electric source 32 and the node N1. The smoothing capacitor C is electrically connected between the electric source line PL and the ground line GL. A negative terminal of the first electric source 31 is electrically connected to the ground line GL. A negative terminal of the second electric source 32 is electrically connected to the node N3. The inverter 35 is electrically connected to each of the electric source line PL and the around line GL.

The smoothing capacitor C is electrically connected to each of the electric source line PL and the ground line GL. The smoothing capacitor C is configured to suppress a fluctuation of an electric voltage between the electric source line PL and the ground line GL, which is caused by the change of the switching states of the switching element S1 to the switching element S4.

The electric power converter 33 has a chopper circuit for each of the first electric source 31 and the second electric source 32. As a result, the electric power converter 33 is capable of performing the electric power conversion with one or both of the first electric source 31 and the second electric source 32.

Specifically, a first chopper circuit in which each of the switching elements S1 and S2 is an upper arm and each of the switching elements S3 and S4 is a lower arm is formed for the first electric source 31. The first chopper circuit may serve as a boost chopper circuit for the first electric source 31, when the vehicle 1 is in the power running state. In this case, the electric power that has been outputted from the first electric source 31 is stored in the reactor L1 during a period in which the switching elements S3 and S4 are in the ON state. The electric power that has been stored in the reactor L1 is supplied to the electric source line PL via at least one portion of the switching elements S1 and S2 and the diodes D1 and D2 during a period in which at least one of the switching elements S3 and S4 is in the OFF state. On the other hand, the first chopper circuit may serve as a step-down chopper circuit for the first electric source 31, when the vehicle 1 is in the regeneration state. In this case. The electric power that has been generated by the regeneration is stored in the reactor L1 during a period in which the switching elements S1 and S3 are in the ON state. The electric power that has been stored in the reactor L1 is supplied to the ground line GL via at least one portion of the switching elements S3 and S4 and the diodes D3 and D4 during a period in which at least one of the switching elements S1 and S2 is in the OFF state.

On the other hand, a second chopper circuit in which each of the switching elements S4 and S1 is an upper arm and each of the switching elements S2 and S3 is a lower arm is prepared for the second electric source 32. The second chopper circuit may serve as a boost chopper circuit for the second electric source 32, when the vehicle 1 is in the power running state. In this case, the electric power that has been outputted from the second electric source 32 is stored in the reactor L2 during a period in which the switching elements S2 and S3 are in the ON state. The electric power that has been stored in the reactor L2 is supplied to the electric source line PL via at least one portion of the switching elements S1 and S4 and the diodes D1 and D4 during a period in which at least one of the switching elements S2 and S3 is in the OFF state. On the other hand, the second chopper circuit may serve as a step-down chopper circuit for the second electric source 32, when the vehicle 1 is in the regeneration state. In this case, the electric power that has been generated by the regeneration is stored in the reactor L2 during a period in which the switching elements S1 and S4 are in the ON state. The electric power that has been stored in the reactor L2 is supplied to a line to which the negative terminal of the second electric source 32 is connected via at least one portion of the switching elements S2 and S3 and the diodes D2 and D3 during a period in which at least one of the switching elements S1 and S4 is in the OFF state.

Note that the electric power converter 33 may perform the electric power conversion simultaneously with both of the first electric source 31 and the second electric source 32. Namely, the electric power converter 33 may perform the electric power conversion so that the electric current flows between the electric power converter 33 and the first electric source 31 and the electric current flows between the electric power converter 33 and the second electric source 32. Alternatively, the electric power converter 33 may perform the electric power conversion with one of the first electric source 31 and the second electric source 32 and may not perform the electric power conversion with the other one of the first electric source 31 and the second electric source 32. Namely, the electric power converter 33 may perform the electric power conversion so that the electric current flows between the electric power converter 33 and one of the first electric source 31 and the second electric source 32 and the electric current does not flow between the electric power converter 33 and the other one of the first electric source 31 and the second electric source 32.

The electric power converter 33 may perform the electric power conversion in a plurality of connecting modes that can be distinguished on the basis of a difference of an electric connecting condition of the first electric source 31 and the second electric source 32 between the electric power line PL and the ground line GL.

A parallel connecting mode is one example of the plurality of connecting modes. The parallel connecting mode is a connecting mode in which the electric power conversion is performed in a state where the first electric source 31 and the second electric source 32 are electrically connected in parallel between the electric source line PL and the ground line GL. A series connecting mode is another one example of the plurality of connecting modes. The series connecting mode is a connecting mode in which the electric power conversion is performed in a state where the first electric source 31 and the second electric source 32 are electrically connected in series between the electric source line PL and the ground line GL. Note that the parallel connecting mode and the series connecting mode are described in detail in the above descried Patent Literature 2 (Japanese Unexamined Patent Application Publication No. 2013-13234). Thus, a detailed description of each of the parallel connecting mode and the series connecting mode is omitted in this specification for the purpose of simple illustration.

Note that the above described structure of the electric power converter 33 is merely one example. Therefore, the structure of the electric power converter 33 may be modified appropriately. For example, the electric power converter 33 may has three or less switching elements or five or more switching elements.

(1-1-3) Structure of ECU 40

Next, with reference to FIG. 3, FIG. 5($a$) and FIG. 5($b$), one example of the structure of the ECU 40 will be described. FIG. 3 is a block diagram illustrating one example of the structure of the ECU 40. FIG. 4($a$) and FIG. 4($b$) are waveform drawing and table illustrating various signals that are generated by the ECU 40 when the electrical power converter 33 performs the electric power conversion in the series connecting mode. FIG. 5($a$) and FIG. 5($b$) are waveform drawing and table illustrating various signals that are generated by the ECU 40 when the electrical power converter 33 performs the electric power conversion in the parallel connecting mode.

As illustrated in FIG. 3, the ECU 40 has a first PWM (Pulse Width Modulation) controlling unit 41, a second PWM controlling unit 42, a third PWM controlling unit 43, a carrier signal generating unit 44, a phase difference adding unit 45, a control signal generating unit 46, and a signal selecting unit 47.

The first PWM controlling unit 41 is configured to generate a PWM signal SDc for controlling the electric power converter 33 performing the electric power conversion in the series connecting mode. In order to generate the PWM signal SDc, the first PWM controlling unit 41 has an adder 411, a PI (Proportional Integral) processor 412 and comparator 413.

The adder 411 is configured to output a deviation signal Ic representing a deviation (namely, a difference) of a reactor current signal I1 that represents electric current flowing in the reactor L1 to a command signal I1* that represents a target value of the reactor current signal I1. Note that the reactor current signal I1 is same as a reactor current signal I2 that represents electric current flowing in the reactor L2 when the electric power converter 33 performs the electric power conversion in the series connecting mode. Therefore, it can be said that the adder 411 is configured to output the deviation signal Ic representing a deviation of the reactor current signal I2 to a command signal I2* that represents a target value of the reactor current signal I2. In the following description, each of the reactor current signals I1 and I2 is referred to us a reactor current signal I and each of the command signals I1* and I2* is referred to as a command signal I* when the electric power converter 33 performs the electric power conversion is the series connecting mode.

The deviation signal Ic that has been outputted from the adder 411 is inputted to the PI processor 412. The PI processor 412 is configured to generate an output signal Dc by performing an operation based on a PI control on an input signal that is the deviation signal Ic. In order to perform the operation based on the PI control, the PI processor 412 has an amplifier 4121, an amplifier 4122, an integrator 4123 and an adder 4124. The amplifier 4121 is configured to amplify the deviation signal Ic at an amplification factor based on a proportional gain kpc. The amplifier 4122 is configured to amplify the deviation signal Ic at an amplification factor based on an integral gain kic. The integrator 4123 is configured to integrate the deviation signal Ic that has been amplified by the amplifier 4122. The odder 4124 is configured to add the deviation signal Ic that has been amplified by the amplifier 4121 and the deviation signal Ic that has beer, integrated by the integrator 4123. As a result, the output signal Dc is outputted from the adder 4124 as a result of the addition.

The comparator 413 is configured to compare a magnitude relationship between the output signal Dc and a carrier signal C that has been generated by the carrier signal generating unit 44. As a result, the PWM signal SDc is generated by the comparator 413. Note that it is assumed that the PWM signal SDc is a PWM signal in which a signal level becomes high level during a period when the output signal Dc>the carrier signal C and the signal level becomes low level during a period when the output signal Dc<the carrier signal C in the first embodiment, as illustrated in FIG. 4(a).

The second PWM controlling unit 42 is configured to generate a PWM signal SDa for controlling the electric power converter 33 performing the electric power conversion in the parallel connecting mode. Especially, the second PWM controlling unit 42 is configured to generate the PWM signal SDa for controlling an aspect of the electric power conversion that is performed by the electric power converter 33 mainly with the first electric source 31. In order to generate the PWM signal SDa, the second PWM controlling unit 42 has an adder 421, a PI processor 422 and a comparator 423.

The adder 421 is configured to output a deviation signal Ia representing a deviation of the reactor current signal I1 to the command signal I1*.

The deviation signal Ia that has been outputted from the adder 421 is inputted to the PI processor 422. The PI processor 422 is configured to generate an output signal Da by performing the operation based on the PI control on an input signal that is the deviation signal Ia. In order to perform the operation based on the PI control, the PI processor 422 has an amplifier 4221, an amplifier 4222, an integrator 4223 and an adder 4224. The amplifier 4221 is configured to amplify the deviation signal Ia at an amplification factor based on a proportional gain kpa. The amplifier 4222 is configured to amplify the deviation signal Ia at an amplification factor based on an integral gain kia. The integrator 4223 is configured to integrate the deviation signal Ia that has been amplified by the amplifier 4222. The udder 4224 is configured to add the deviation signal Ia that has been amplified by the amplifier 4221 and the deviation signal Ia that has been integrated by the integrator 4223. As a result, the output signal Da is outputted from the adder 4224 as a result of the addition.

The comparator 423 is configured to compare a magnitude relationship between the output signal Da and the carrier signal C that has been generated by the carrier signal generating unit 44. As a result, the PWM signal SDa is generated by the comparator 423. Note that it is assumed that the PWM signal SDa is a PWM signal in which a signal level becomes high level during a period when the output signal Da>the carrier signal C and the signal level becomes low level during a period when the output signal Da<the carrier signal C in the first embodiment, as illustrated in FIG. 5(a).

The third PWM controlling unit 43 is configured to generate a PWM signal SDb for controlling the electric power converter 33 performing the electric power conversion in the parallel connecting mode. Especially, the third PWM controlling unit 42 is configured to generate the PWM signal SDb for controlling an aspect of the electric power conversion that is performed by the electric power converter 33 mainly with the second electric source 32. In order to generate the PWM signal SDb, the third PWM controlling unit 43 has an adder 431, a PI processor 432 and a comparator 433.

The adder 431 is configured to output a deviation signal Ib representing a deviation of the reactor current signal I2 to the command signal I2*.

The deviation signal Ib that has been outputted from the adder 431 is inputted to the PI processor 432. The PI processor 432 is configured 10 generate an output signal Db by performing the operation based on the PI control on an input signal that is the deviation signal Ib. In order to perform the operation based on the PI control, the PI processor 432 has an amplifier 4321, an amplifier 4322, an integrator 4323 and an adder 4324. The amplifier 4321 is configured to amplify the deviation signal Ib at an amplification factor based on a proportional gain kpb. The amplifier 4322 is configured to amplify the deviation signal Ib at an amplification factor bused on an integral gain kib. The integrator 4323 is configured to integrate the deviation signal Ib that has been amplified by the amplifier 4322. The adder 4324 is configured to add the deviation signal Ib that has been amplified by the amplifier 4321 and the deviation signal Ib that has been integrated by the integrator 4323. As a result, the output signal Db is outputted from the adder 4324 as a result of the addition.

The comparator 433 is configured to compare a magnitude relationship between the output signal Db and a carrier signal C' that has been generated by the phase difference adding unit 45. As a result, the PWM signal SDb is generated by the comparator 433. Note that it is assumed that the PWM signal SDb is a PWM signal in which a signal level becomes high level during a period when the output signal Db>the carrier signal C and the signal level becomes low level during a period when the output signal Db<the carrier signal C in the first embodiment, as illustrated in FIG. 5(a).

The carrier signal generating unit 44 is configured 10 generate the carrier signal C. As described above, the carrier signal C is used by the first PWM controlling unit 41 to generate the PWM signal SDc. In a same manner, the carrier signal C is used by the second PWM controlling unit 42 to generate the PWM signal SDa.

The phase difference adding unit 45 is configured to add a desired phase difference φ to the carrier signal C that has been generated by the carrier signal generating unit 44. Namely, as illustrated in FIG. 5(a). The phase difference adding unit 45 is configured to generate new carrier signal C' to which the phase difference φ has been added by shifting, by the phase difference φ, a phase of the carrier signal C that has been generated by the carrier signal generating unit 44. The carrier signal C' is used by the third PWM controlling unit 43 to generate the PWM signal SDb.

In the first embodiment, as described later in detail, the phase difference adding unit 45 is configured to change the phase difference φ that is added to the carrier signal C on the basis of a result of a determination whether or not the vehicle 1 is in a high-load driving state. For example, the phase difference adding unit 45 may add the phase difference φ#1 to the carrier signal C, if the vehicle 1 is in the high-load driving state (for example, a load of the vehicle 1 is equal to or larger than a predetermined threshold value). On the other hand, for example, the phase difference adding unit 45 may add the phase difference φ#2 that is different from the phase difference φ#1 to the carrier signal C, if the vehicle 1 is not in the high-load driving state (for example, the load of the vehicle 1 is smaller than the predetermined threshold value). Note that an operation of changing the phase difference φ on the basis of the result of the determination whether or not the vehicle 1 is in the high-load driving state will be described later in detail (see FIG. 6 to FIG. 7).

The control signal generating unit 46 is configured to generate, by using the PWM signal SDc, a control signal SG1(S) to a control signal SG4(S) that defines the switching states of the switching element S1 to the switching element S4, respectively, when the electric power converter S3 performs the electric power conversion in the series connecting mode. Specifically, the control signal generating unit 46 is configured to generate an inverted PWM signal /SDc of the PWM signal SDc (see FIG. 4(a)). The inverted PWM signal /SDc is used as the control signal SG2(S) for the switching element S1, as illustrated in FIG. 4(b). On the other hand, the PWM signal SDc is used as the control signal SG2(S) for the switching element S2, as illustrated in FIG. 4(b). In a same manner, the PWM signal SDc is used as the control signal SG4(S) for the switching element S4, as illustrated in FIG. 4(b). Note that the control signal SG3(S) for the switching element S3 is fixed to the high-level signal in the first embodiment, as illustrated in FIG. 4(b).

The control signal generating unit 46 is configured to generate, by using the PWM signal SDa and the PWM signal SDb, a control signal SG1(P) to a control signal SG4(P) that defines the switching states of the switching element S1 to the switching element S1, respectively, when the electric power converter 33 performs the electric power conversion in the parallel connecting mode. Specifically, the control signal generating unit 46 is configured to generate an inverted PWM signal /SDa of the PWM signal SDa (see FIG. 5(a)). In a same manner, the control signal generating unit 46 is configured to generate an inverted PWM signal /SDb of the PWM signal SDb (see FIG. 5(a)). The control signal generating unit 46 is configured to generate (i) an OR signal (a logical add signal) of the inverted PWM signal /SDa and the inverted PWM signal /SDb, (ii) an OR signal of the inverted PWM signal /SDa and the PWM signal SDb, (iii) an OR signal of the PWM signal SDa and the PWM signal SDb and (iv) an OR signal of the PWM signal SDa and the inverted PWM signal /SDb. The OR signal of the inverted PWM signal /SDa and the inverted PWM signal /SDb is used as the control signal SG1(P) for the switching element S1, as illustrated in FIG. 5(b). The OR signal of the inverted PWM signal /SDa and the PWM signal SDb is used as the control signal SG2(P) for the switching element S2, as illustrated in FIG. 5(b). The OR signal of the PWM signal SDa and the PWM signal SDb is used as the control signal SG3(P) for the switching element S3, as illustrated in FIG. 5(b). The OR signal of the PWM signal SDa and the inverted PWM signal /SDb is used as the control signal SG4(P) for the switching element S4, as illustrated in FIG. 5(b).

The signal selecting unit 47 is configured to output, as the control signal SG1 to the control signal SG4 each of which define the switching state of respective one of the switching element S1 to the switching element 4, the control signal SG1(S) to the control signal SG4(S) to the switching element S1 to the switching element S4, respectively, when the electric power converter 33 performs the electric power conversion in the parallel connecting mode. As a result, the switching element S1 to the switching element S4 switch on the basis of the control signal SG1(S) to the control signal SG4(S), respectively. Namely, the electric power converter 33 performs the electric power conversion in the series connecting mode.

The signal selecting unit 47 is configured to output, as the control signal SG1 to the control signal SG4, the control signal SG1(P) to the control signal SG4(P) to the switching element S1 to the switching element S4, respectively, when the electric power converter 33 performs the electric power conversion in the parallel connecting mode. As a result, the switching element S1 to the switching element S4 switch on the basis of the control signal SG1(P) to the control signal SG4(P), respectively. Namely, the electric power converter 33 performs the electric power conversion in the parallel connecting mode.

(1-2) Flow of Operation of ECU 40

Next, with reference to FIG. 6, a flow of the operation of the ECU 40 (especially, the operation of changing the phase difference φ that is added to the carrier signal C) will be described. FIG. 6 is a flowchart illustrating one example of the flow of the operation of the ECU 40 (especially, the operation of changing the phase difference φ that is added to the carrier signal C).

Note that the operation illustrated in FIG. 6 corresponds to a sub-routine that is periodically performed by the ECU 40 during a period when a main-routine by which the electric power converter 33 is controlled by the ECU 40 to perform the electric power conversion in either one of the series connecting mode and the parallel connecting mode is performed. However, the ECU 40 may perform the operation (the sub-routine) illustrated in FIG. 6 when a certain start condition is satisfied during the period when the above described main-routine is performed (alternatively, may perform the operation illustrated in FIG. 6 at a desired liming).

Especially, the change of the phase difference φ is reflected in the operation of the electric power converter 33, when the electric power converter 33 performs the electric power conversion in the parallel connecting mode. Therefore. The operation illustrated in FIG. 6 corresponds to the sub-routine that is periodically performed by the ECU 40 (especially, the phase difference adding unit 45) during a period when the main-routine by which the electric power converter 33 is controlled by the ECU 40 to perform the electric power conversion in the parallel connecting mode is performed.

As illustrated in FIG. 6, the ECU 40 (especially, the phase difference adding unit 45) determines whether or not the vehicle 1 is in the high-load driving state (step S11). Namely, the ECU 40 determines whether or not the load of the vehicle 1 is equal to or larger than the predetermined threshold value that distinguishes between the high-load driving state and a non-high-load driving state.

The ECU 40 may determine whether or not the vehicle 1 is in the high-load driving state on the basis of an element temperature of at least one of the switching element S1 to the switching element S4. For example, the ECU 40 may determine that the vehicle 1 is in the high-load driving state, if the element temperature of at least one of the switching element S1 to the switching element S4 is relatively high (for example, higher than a predetermined temperature). For example, the ECU 40 may determine that the vehicle 1 is not in the high-load driving state, if the element temperature of at least one of the switching element S1 to the switching element S4 is relatively low (for example, lower than a predetermined temperature).

The ECU 40 may determine whether or not the vehicle 1 is in the high-loud driving state on the basis of at least one of the reactor current signals I1 and I2 (alternatively, its average value, its maximum value or the like, the same shall apply hereinafter). For example, the ECU 40 may determine that the vehicle 1 is in the high-load driving state. If at least one of the reactor current signals I1 and I2 is relatively large (for example, larger than a predetermined current value). For example, the ECU 40 may determine (not the vehicle 1 is not in the high-load driving state, if at least one of the reactor current signals I1 and I2 is relatively small (for example, smaller than a predetermined current value).

The ECU 40 may determine whether or not the vehicle 1 is in the high-load driving state on the basis of an output of the motor generator 10 that can be calculated by multiplying a torque of the motor generator 10 with a rotation number of the motor generator 10. For example, the ECU 40 may determine that the vehicle 1 if in the high-load driving state, if the output of the motor generator 10 is relatively large (for example, larger than a predetermined output value). For example, the ECU 40 may determine that the vehicle 1 is not in the high-load driving state, if the output of the motor generator 10 is relatively small (for example, smaller than a predetermined output value).

Note that it can be said that a state where the vehicle 1 is in the high-load driving state corresponds to a state where the electric source system 30 is in a high-load state, because the vehicle 1 moves by using the electric power outputted from the electric source system 30. Therefore, it can be said that the operation at the step S11 that determines whether or not the vehicle 1 is in the high-load driving mode substantially corresponds to the operation that determines whether or not the electric source system 30 is in the high-load mode (namely, whether or not a load of the electric source system 30 is equal to or larger than a predetermined threshold value that distinguishes between the high-load state and a non-high-load state.

As a result of the determination at the step S11, if it is determined that the vehicle 1 is in the high-load driving state (step S11: Yes), there is estimated to be a high possibility that the element temperature of at least one of the switching element S1 to the switching element S4 excessively increases, compared to the case where it is determined that the vehicle 1 is not in the high-load driving state. In this case, the ECU 40 determines that the electric source system 30 (especially, the electric power converter 33) should operate to suppress the increase of the element temperature of at least one of the switching element S1 to the switching element S4. Thus, the ECU 40 (especially, the phase difference adding unit 45) adds, to the carrier signal C, the phase difference $\phi\#1$ that is capable of suppressing the increase of the element temperature of the switching element S1 to the switching element S4 (step S12).

In this case, it is preferable that the ECU 40 add, to the carrier signal C, the phase difference $\phi\#1$ that is capable of suppressing the increase of the element temperature of one switching element having the highest element temperature among the switching element S1 to the switching element S4. For example, if the element temperature of the switching element S1 is higher than the element temperatures of the switching element S2 to the switching element S4, it is preferable that the ECU 40 add, to the carrier signal C, the phase difference $\phi\#1$ that is capable of suppressing the increase of the element temperature of the switching element S1.

On the other hand, as a result of the determination al the step S11, if it is determined that the vehicle 1 is not in the high-load driving state (step S11: No), there is estimated to be a low possibility that the element temperature of at least one of the twitching element S1 to the twitching element S4 excessively increases, compared to the case where it is determined that the vehicle 1 if in the high-load driving state. Therefore, it is estimated that the electric source system 30 (especially, the electric power converter 33) does not necessarily operate to suppress the increase of the element temperature of at least one of the switching element S1 to the switching element S4. In this case, the ECU 40 determines that the electric source system 30 (especially, the electric power converter 33) should operate so that an efficiency of the electric power conversion in the entire electric source system 30 increases (namely, a loss in the entire electric source system 30 decreases). Thus, the ECU 40 (especially, the phase difference adding unit 45) adds, to the carrier signal C, the phase difference $\phi\#2$ that is capable of increasing the efficiency of the electric power conversion (step S13).

Note that the "suppression of the increase of the element temperature of the switching element Sk (k=1, 2, 3 or 4)" that is realized by adding the phase difference $\phi\#1$ means the suppression of the increase from the element temperature of the switching element Sk when the phase difference $\phi\#2$ is added. Namely, the suppression of the increase of the element temperature of the switching element Sk means a state where the element temperature of the switching element Sk when the phase difference $\phi\#1$ is added is equal to or lower than the element temperature of the switching element Sk when the phase difference $\phi\#2$ is added.

This phase difference $\phi\#1$ may be stored, as one portion of parameters for defining a driving condition of the vehicle 1, in a memory or the like in the ECU 40 in advance. For example, the memory in the ECU 40 may store, as the phase differences $\phi\#1$, a phase difference $\phi\#1-1$ that is capable of suppressing the increase of the element temperature of the switching element S1, a phase difference $\phi\#1-2$ that is capable of suppressing the increase of the element temperature of the switching element S2, a phase difference $\phi\#1-3$ that is capable of suppressing the increase of the element temperature of the switching element S3 and a phase difference $\phi\#1-4$ that is capable of suppressing the increase of the element temperature of the switching element S4 in advance. In this case, the ECU 40 may add the phase difference $\phi\#1$ to the carrier signal C by reading the phase difference $\phi\#1$ stored in the memory.

In a same manner, the "increase of the efficiency of the electric power conversion" that is realized by adding the phase difference $\phi\#2$ means the increase from the efficiency of the electric power conversion when the phase difference $\phi\#1$ is added. Namely, the increase of the efficiency of the electric power conversion means a state where the efficiency of the electric power conversion when the phase difference ϕ#2 is added is equal to or larger than the efficiency of the electric power conversion when the phase difference ϕ#1 is added. In other words, the increase of the efficiency of the electric power conversion means a state where the loss of the electric source system 30 when the phase difference ϕ#2 is added is equal to or smaller than the loss of the electric source system 30 when the phase difference ϕ#1 is added.

This phase difference ϕ#2 may be stored, as one portion of the parameters for defining the driving condition of the vehicle 1, in the memory or the like in the ECU 40 in advance. In this case, the ECU 40 may add the phase difference ϕ#2 to the carrier signal C by reading the phase difference ϕ#2 stored in the memory.

Here, with reference to FIG. 7, a variation of each of the loss of the electric source system 30 and the element temperatures of the switching element S1 to the switching element S4 before and after the phase difference ϕ is changed will be described. FIG. 7 is a graph illustrating the loss of the electric source system 30, the element temperatures of the switching element S1 to the switching element S4, the control signal SG1 to the control signal SG4, an element current SI1 to an element current SI4 that flow through the switching element S1 to the switching element S4, respectively, and the reactor current signals I1 and I2 before and after the phase difference ϕ is changed.

As illustrated in a left side in FIG. 7, a situation where the phase difference ϕ#2 that is capable of increasing the efficiency of the electric power conversion (namely, decreasing the loss) is added to the carrier signal C will be described. The left side in FIG. 7 illustrates the toss of the electric source system 30, the element temperatures of the switching element S1 to the twitching element S4, the control signal SG1 to the control signal SG4, the element current SI1 to the element current SI4 and the reactor current signals I1 and I2 when the phase difference ϕ#2 is added the carrier signal C. Note that the element current SIk (k=1, 2, 3 or 4) becomes a positive current when it flows (namely, flows through the switching element Sk) from the electric source line PL to the ground line GL. In other words, the element current SIk becomes a negative current when it flows (namely, flows through the diode Dk) from the ground line GL to the electric source line PL.

In this situation, it is assumed to be determined that the vehicle 2 is in the high-load driving state. In this case, as illustrated in the graph at the left side in FIG. 7, the element temperature of the switching element S2 is the highest. Therefore, the ECU 40 adds, to the carrier signal C, the phase difference ϕ#1-2 that is capable of suppressing the increase of the element temperature of the switching element S2, instead of the phase difference ϕ#2 that is capable of increasing the efficiency of the electric power conversion. After the phase difference ϕ that is added to the carrier signal C is changed, a phase of at least one of the above described PWM signals SDa and SDb and the inverted PWM signals /SDa and /SDb also changes. As a result, as illustrated in the graph at a right side in FIG. 7, a phase of at least one of the control signal SG1 to the control signal SG4 (for example, a phase of at least one of a rising edge and a falling edge, a phase of the entire signal) also changes. Since the control signal SG1 to the control signal SG4 define the switching states of the switching element S1 to the switching element S4, respectively, the change of the phase of at least one of the control signal SG1 to the control signal SG4 results in the change of the switching pattern of at least one of the switching element S1 to the switching element S4. Namely, in the first embodiment, it can be said that the ECU 40 substantially changes the switching pattern of at least one of the switching element S1 to the switching element S4 by changing the phase difference ϕ.

When the switching pattern of at least one of the switching element S1 to the switching element S4 changes, at least one of the element current SI1 to the element current SI4 also changes. Here, since the phase difference ϕ#1-2 is capable of suppressing the increase of the element temperature of the switching element S2, an effective value of the element current SI2 decreases. Specifically, after the phase difference ϕ#1-2 is added, the reactor current L1 and the reactor current L2 flow in directions to cancel out each other through the switching element S2. As a result, the effective value of the element current SI2 decreases due to the cancelation of the electric currents flowing through the switching element S2. The decrease of the effective value of the element current SI2 results in a decrease of the loss of the switching element S2 itself. The decrease of the loss of the switching element S2 itself results in the decrease of the element temperature of the switching element S2. As a result, as illustrated in the right side in FIG. 7, the increase of the element temperature of the switching element S2 is suppressed (in an example illustrated in FIG. 7. The element temperature of the switching element S2 decreases) by way of the phase difference ϕ#1-2 being added, compared to the case where the phase difference ϕ#2 is added.

Conversely, the phase difference ϕ#1-k that is capable of suppressing the increase of the element temperature of the switching element Sk is calculated so as to decrease the effective value of the element current SIk. In other words, the phase difference ϕ#1-k is calculated so that the reactor current L1 and the reactor current L2 flow in directions to cancel out each other through the switching element Sk. The phase difference ϕ#1-k may be calculated in advance on the basis of the above viewpoint.

As described above, the ECU 40 in the first embodiment is capable of changing the phase difference ϕ that should be added to the carrier signal C on the basis of the result of the determination whether or not the vehicle 1 is in the high-load driving state. Namely, the ECU 40 in the first embodiment is capable of changing the switching pattern of at least one of the switching element S1 to the switching element S4 on the basis of the result of the determination whether or not the vehicle 1 is in the high-load driving state. As a result, the ECU 40 is capable of adding the phase difference ϕ1 that is capable of suppressing the increase of the element temperature of at least one of the switching element S1 to the switching element S4 if the vehicle 1 is in the high-load driving state and adding the phase difference ϕ2 that is capable of decreasing the loss of the entire electric source system 30 (namely, increasing the efficiency of the electric power conversion) if the vehicle 1 is not in the high-load driving state. Namely, the ECU 40 is capable of changing the switching pattern of at least one of the switching element S1 to the switching element S4 on the basis of the state of the electric source system 30. Therefore, the ECU 40 is capable of suppressing the excessive increase of the element temperature of at least one of the switching element S1 to the switching element S4 while decreasing the loss of the entire electric source system 30 (namely, increasing the efficiency of the electric power conversion).

Note that the loss of the entire electric system 30 increases although the loss of the switching element S2 itself decreases when the phase difference ϕ#1-2 is added, compared to the case where the phase difference ϕ#2 is added, as illustrated in FIG. 7. However, in the first embodiment, the ECU 40 adds the phase difference ϕ#1 in a limited situation where there is a possibility that the element temperature of at least one of the switching element S1 to the switching element S4 increases excessively. As a result, the ECU 40 is capable of suppressing the excessive increase of the element temperature of at least one of the switching element S1 to the switching element S4 without causing the excessive increase of the loss of the entire electric source system 30 (namely, the excessive decrease of the efficiency of the electric power conversion). Namely, (the ECU 40 is capable of suppressing the excessive increase of the element temperature of at least one of the switching element S1 to the switching element S4 while decreasing the loss of the entire electric source system 30 (namely, increasing the efficiency of the electric power conversion).

Moreover, as illustrated in the lowermost graph to FIG. 7, the change of the phase difference φ that is added to the carrier signal does not cause the change of the characteristics other than the phases of the reactor current signals I1 and I2. Therefore, the ECU 40 is capable of changing the phase difference φ without affecting the operation of the motor generator 10 substantially.

(2) Second Embodiment

Next, a vehicle 2 in a second embodiment will be described. The vehicle 2 in the second embodiment is different from the vehicle 1 in the first embodiment in that one portion of the operation of the ECU 40 is different. More specifically, in the above described first embodiment, the phase difference adding unit 45 changes the switching patter of at least one of the switching element S1 to the switching element S4 by changing the phase difference φ. On the other hand, in the second embodiment, the ECU 40 changes the switching patter of at least one of the switching element S1 to the switching element S4 not using the phase difference adding unit 45. Namely, in the second embodiment, the ECU 40 changes the switching patter of at least one of the switching element S1 to the switching element S4 without changing the phase difference φ. The structure and another operation of the vehicle 2 in the second embodiment may be same as the structure and another operation of the vehicle 1 in the first embodiment.

Therefore, in the following description, with reference to FIG. 8, a flow of the operation of the ECU 40 in the second embodiment will be described. FIG. 8 is a flowchart illustrating one example of the flow of the operation of the ECU 40 in the second embodiment. Note that same step number is assigned to the operation that is same as the operation of the ECU 40 in the first embodiment and its detailed description will be omitted. Moreover, the operation illustrated in FIG. 8 corresponds to the sub-routine that is performed by the ECU 40 during the period when the main-routine by which the electric power converter 33 is controlled by the ECU 40 to perform the electric power conversion in either one of the series connecting mode and the parallel connecting mode is performed, as with the operation illustrated in FIG. 6.

As illustrated in FIG. 8, as in the second embodiment, the ECU 40 determines whether or not the vehicle 1 is in the high-load driving state (step S11).

As a result of the determination at the step S11, if it is determine that the vehicle 1 is in the high-load driving state (step S11: Yes), the ECU 40 selects, as the switching pattern of the switching element S1 to the switching element S4, a switching pattern #1 that is capable of suppressing the increase of the element temperature of al least one of the switching element S1 to the switching element S4 (step S22). In this case, the switching element S1 to the switching element S4 switch on the basis of the switching pattern #1 to the switching pattern #4 that are selected at the step S22, respectively. As a result, the increase of the element temperature of at least one of the switching element S1 to the switching element S4 is suppressed.

On the other hand, as a result of the determination at the step S11, if it is determined that the vehicle 1 is not in the high-load driving state (step S11: No), the ECU 40 selects, as the switching pattern of the switching element S1 to the switching element S4, a switching pattern #2 that is capable of increasing the efficiency of the electric power conversion (step S23). In this case, the switching element S1 to the switching element S4 switch on the basis of the switching pattern #1 to the switching pattern #4 that are selected at the step S23, respectively. As a result, the efficiency of the electric power conversion is increased.

Note that the "suppression of the increase of the element temperature of the switching element Sk" here means the suppression of the increase from the element temperature of the switching element Sk when the switching pattern #2 is selected, as with the first embodiment. In a same manner, the "increase of the efficiency of the electric power conversion" here means the increase from the efficiency of the electric power conversion when the switching pattern #1 is selected, as with the first embodiment.

This switching pattern #1 may be calculated in advance in a same manner as the phase difference φ#1. The switching pattern #1 may be stored, as one portion of the parameters for defining the driving condition of the vehicle 1, in the memory or the like in the ECU 40 in advance. The same is true of the switching pattern #2.

As described above, as in the second embodiment, the various effects that can be achieved in the first embodiment is achieved appropriately.

Especially in the second embodiment, the ECU 40 is capable of changing the switching pattern of at least one of the switching element S1 to the switching element S4, regardless of the change of the phase difference φ that is added to the carrier signal C. Thus, the ECU 40 is capable of changing the switching pattern of at least one of the switching element S1 to the switching element S4 even when the electric power converter 33 does not perform the electric power conversion in the parallel connecting mode. For example, the ECU 40 is capable of changing the switching pattern of at least one of the switching element S1 to the switching element S4 even when the electric power converter 33 performs the electric power conversion in the series connecting mode. Alternatively, for example, the ECU 40 is capable of changing the switching pattern of at least one of the switching element S1 to the switching element S4 even when the electric power converter 33 performs the electric power conversion with one of the first electric source 31 and the second electric source 32 and does not perform the electric power conversion with the other one of the first electric source 31 and the second electric source 32. Alternatively, for example, the ECU 40 is capable of changing the switching pattern of at least one of the switching element S1 to the switching element S4 even when the electric power converter 33 has any structure. As result, the above described various effect can be achieved in any cases.

(3) Third Embodiment

Next, a vehicle 3 in a third embodiment will be described. The vehicle 3 in the third embodiment is different from the vehicle 1 in the first embodiment in that one portion of the operation of the ECU 40 is different. The structure and another operation of the vehicle 3 in the third embodiment may be same as the structure and another operation of the vehicle 1 in the first embodiment.

Therefore, in the following description, with reference to FIG. 9, a flow of the operation of the ECU 40 in the third embodiment will be described. FIG. 9 is a flowchart illustrating one example of the flow of the operation of the ECU 40 is the third embodiment. Note that same step number is assigned to the operation that is same as the operation of the ECU 40 in the first embodiment and its detailed description will be omitted. Moreover, the operation illustrated in FIG. 9 corresponds to the sub-routine that is performed by the ECU 40 during the period when the main-routine by which the electric power converter 33 is controlled by the ECU 40 to perform the electric power conversion in either one of the series connecting mode and the parallel connecting mode is performed, as with the operation illustrated in FIG. 6.

As illustrated in FIG. 9, as in the third embodiment, the ECU 40 (especially, the phase difference adding unit 45) determines whether or not the vehicle 1 is in the high-load driving state (step S11).

As a result of the determination at the step S11, if it is determined that the vehicle 1 is not in the high-load driving state (step S11: No), the ECU 40 (especially, the phase difference adding unit 45) adds, to the carrier signal C, the phase difference $\phi\#2$ that is capable of increasing the efficiency of the electric power conversion (step S13).

On the other hand, as a result of the determination at the step S11, if it is determined that the vehicle 1 is in the high-load driving state (step S11: Yes), the ECU 40 adds, to the carrier signal C. The phase difference $\phi\#1$ that is capable of suppressing the increase of the element temperature of at least one of the switching element S1 to the switching element S4 (step S31 to step S33). Especially in the third embodiment, the ECU 40 switches the phase difference $\phi\#1$ that should be added to the carrier signal C between the phase difference $\phi\#1-i$ (i=1, 2, 3 or 4) that is capable of suppressing the increase of the element temperature of the switching element Si and the phase difference $\phi\#1-j$ (j=1, 2, 3 or 4 and j≠i) that is capable of suppressing the increase of the element temperature of the switching element Sj every time a predetermined time elapses (step S31 to step S33).

Note that the "suppression of the increase of the element temperature of the switching element Sk" that is realized by adding the phase difference $\phi\#1-k$ (k=1, 2, 3 or 4) may mean the suppression of the increase from the element temperature of the switching element Sk when the phase difference $\phi\#1-k$ is not added, in addition to or instead of meaning the suppression of the increase from the element temperature of the switching element Sk when the phase difference $\phi\#2$ is added as with the first embodiment and the second embodiment.

Here, it is preferable that the switching elements Si and Sj be two switching element having higher element temperatures than the other switching elements) among the switching element S1 to the switching element S4. For example, if the element temperatures of the switching elements S2 and S3 are higher than the element temperatures of the switching elements S1 and S4, it is preferable that the ECU 40 switch the phase difference $\phi\#1-2$ that should be added to the carrier signal C between the phase difference $\phi\#1-2$ that is capable of suppressing the increase of the element temperature of the switching element S2 and the phase difference $\phi\#1-3$ that is capable of suppressing the increase of the element temperature of the switching element S3.

Here, with reference to FIG. 10, a variation of each of the loss of the electric source system 30 and the element temperatures of the switching element S1 to the switching element S4 before and after the phase difference $\phi\#1$ is switched will be described. FIG. 10 is a graph illustrating the loss of the electric source system 30, the element temperatures of the switching element S1 to the switching element S4, the control signal SG1 to the control signal SG4, the element current SI1 to the element current SI4 that flow through the switching element S1 to the witching element S4, respectively, and the reactor current signals I1 and I2 before and after the phase difference $\phi\#1$ is switched.

A center side in FIG. 10 illustrates the loss of the electric source system 30, the element temperatures of the switching element S1 to the switching element S4, the control signal SG1 to the control signal SG4, the element current SI1 to the element current SI4 and the reactor current signals I1 and I2 when the phase difference $\phi\#1-2$ that is capable of suppressing the increase of the element temperature of the switching element S2 is added to the carrier signal C. In an example illustrated in FIG. 10, the control signal SG2 is fixed to the high level signal when the phase difference $\phi\#1-2$ is added to the carrier signal C. Therefore, the loss of the switching element S2 is substantially only a conduction loss. Namely, there is no switching loss in the switching element S2. As a result, the increase of the element temperature of the switching element S2 is suppressed.

Moreover, a left center side in FIG. 10 illustrates the loss of the electric source system 30. The element temperatures of the switching element S1 to the switching element S4, the control signal SG1 to the control signal SG4, the element current SI1 to the element current SI4 and the reactor current signals I1 and I2 when the phase difference $\phi\#1-3$ that is capable of suppressing the increase of the element temperature of the switching element S3 is added to the carrier signal C. In an example illustrated in FIG. 10, the control signal SG3 is fixed to the high level signal when the phase difference $\phi\#1-3$ is added to the carrier signal C. Therefore, the loss of the switching element S3 is substantially only a conduction loss. Namely, there is no switching loss in the switching element S3. As a result, the increase of the element temperature of the switching element S3 is suppressed.

The ECU 40 switches the phase difference $\phi\#1$ that should be added to the carrier signal C between the phase difference $\phi\#1-2$ and the phase difference $\phi\#1-3$ every time the predetermined time elapse. As a result, as illustrated in a right side in FIG. 10, the control signal SG1 to the control signal SG4, the element current SI1 to the element current SI4 and the reactor current signals I1 and I2 vary after the phase difference $\phi\#1$ is switched. Specifically, when the phase difference $\phi\#1-2$ is added, the control signal SG1 to the control signal SG4 and the element current SI1 to the element current SI4 vary to suppress the increase of the element temperature of the switching element S2. When the phase difference $\phi\#1-3$ is added, the control signal SG1 to the control signal SG4 and the element current SI1 to the element current SI4 vary to suppress the increase of the element temperature of the switching element S3. Therefore, the increase of the element temperatures of both of the switching elements S2 and S3 it suppressed (in an example illustrated in FIG. 10, the element temperature of both of the switching elements S2 and S3 decrease) by way of the phase differences $\phi\#1-2$ and $\phi\#1-3$ being added alternately, compared to the case where the phase difference $\phi\#2$ is added or the phase difference $\phi\#1-2$ or the phase difference $\phi\#1-3$ is kept to be added.

As described above, as in the third embodiment, the various effects that can be achieved in the first embodiment is achieved appropriately. Especially in the third embodiment, the ECU 40 is capable of switching the phase difference φ#1 that should be added to the carrier signal C appropriately. Therefore, the ECU 40 is capable of suppressing the increase of the element temperatures of the plurality of switching elements to some extent.

Note that the phase difference φ#1 that should be added to the carrier signal C is switched between the phase difference φ#1−i and the phase difference φ#1−j in the above described description. However, the ECU 40 may switch the phase difference φ#1 that should be added to the carrier signal C among the phase difference φ#1−i, the phase difference φ#1−j and the phase difference φ#1−k (k=1, 2, 3 or 4, k≠i and k≠j) that is capable of suppressing the increase of the element temperature of the twitching element Sk. The ECU 40 may switch the phase difference φ#1 that should be added to the carrier signal C among the phase difference φ#1−1, the phase difference φ#1−2, the phase difference φ#1−3 and the phase difference φ#1−4.

Moreover, as in the third embodiment, the ECU 40 may change the switching pattern of at least one of the switching element S1 to the switching element S4, regardless of the change of the phase difference φ that is added to the carrier signal C, as with the second embodiment. For example, the ECU 40 may switch the switching pattern of at least one of the switching element S1 to the switching element S4 between the switching pattern that is capable of suppressing the increase of the element temperature of the switching element Si and the switching pattern that is capable of suppressing the increase of the element temperature of the switching element Sj.

(4) Fourth Embodiment

Next, a vehicle 4 in a fourth embodiment will be described. The vehicle 4 in the fourth embodiment is different from the vehicle 1 in the first embodiment in that each of one portion of the structure of the ECU 40 and one portion of the operation of the ECU 40 is different. Another structure and another operation of the vehicle 4 in the fourth embodiment may be same as the structure and another operation of the vehicle 1 in the first embodiment. Therefore, in the following description, the structure and the operation that are particular to the vehicle 4 in the fourth embodiment will be described.

(4-1) Modified Example of ECU 40

Firstly, with reference to FIG. 11, the structure of an ECU 40x in the fourth embodiment will be described. FIG. 11 is a block diagram illustrating one example of the structure of the ECU 40x in the fourth embodiment. Note that same reference sign is assigned to the structure that in same as the structure of the ECU 40 in the first embodiment and its detailed description will be omitted.

As illustrated in FIG. 11, the ECU 40x in the fourth embodiment is different from the ECU 40 in the first embodiment in that the ECU 40x has a delay adding unit 49x. Another structure of the ECU 40x in the fourth embodiment may be same as another structure of the ECU 40 to the first embodiment.

The delay adding unit 49x is configured to add a delay to at least one of the control signal SG1 to the control signal 804 that are outputted from the signal selecting unit 47. Specifically, the delay adding unit 49x is configured to add the delay to at least one of the control signal SG1 to the control signal SG4 so that at least one portion of the rising edge and the falling edge of at least one of the control signal SG1 to the control signal SG4 is shifted in a time axis direction. As a result, the delay adding unit 49x is capable of substantially changing the switching pattern of at least one of the switching element S1 to the switching element S4.

In order to add the delay, the delay adding unit 49x has a delay device 491x, a delay device 492x, a delay device 493x, a delay device 494x and a delay controlling unit 495x. The delay device 491x is configured to add the delay to the control signal SG1 so that at least one portion of the rising edge and the falling edge of the control signal SG1 is shifted in the time axis direction. The delay device 492x is configured to add the delay to the control signal SG2 so that at least one portion of the rising edge and the falling edge of the control signal SG2 is shifted in the time axis direction. The delay device 493x is configured to add the delay to the control signal SG3 so that at least one portion of the rising edge and the falling edge of the control signal SG3 is shifted in the time axis direction. The delay device 494x is configured to add the delay to the control signal SG4 so that at least one portion of the rising edge and the falling edge of the control signal SG4 is shifted in the time axis direction. The delay controlling unit 495x is configured to select a delay adding manner D (for example, an amount of the added delay, a timing at which the delay is added and so on) of each of the delay device 491x, the delay device 492x, the delay device 493x, the delay device 494x. Each of the delay device 491x, the delay device 492x, the delay device 493x, the delay device 494x is configured to add the delay in the delay adding manner D selected by the delay controlling unit 495x.

In the fourth embodiment, since the ECU 40x has the delay adding unit 49x. The ECU 40x is capable of changing the switching patient of at least one of the switching element S1 to the switching element S4 by using a method that is different from the method of changing the phase difference φ that is added to the carrier signal C. Therefore, the ECU 40x is capable of changing the switching pattern of at least one of the switching element S1 to the switching element S4 even when the electric power converter 33 does not perform the electric power conversion in the parallel connecting mode. For example, the ECU 40x is capable of changing the switching pattern of at least one of the switching element S1 to the switching element S4 even when the electric power converter 33 performs the electric power conversion in the series connecting mode.

In the following description, the operation of the ECU 40x that changes the switching pattern when the electric power converter 33 performs the electric power conversion in the series connecting mode will be described more.

(4-2) Flow of Operation of ECU 40x

Next, with reference to FIG. 12, a flow of the operation (especially, the operation of adding the delay) of the ECU 40x will be described. FIG. 12 is a flowchart illustrating one example of the flow of the operation (especially, the operation of adding the delay) of the ECU 40x. Note that the operation illustrated in FIG. 12 corresponds to the subroutine that is performed by the ECU 40 during the period when the main-routine by which the electric power converter 33 is controlled by the ECU 40 to perform the electric power conversion in either one of the series connecting mode and the parallel connecting mode is performed, as with the operation illustrated in FIG. 6.

As illustrated in FIG. 12, the ECU 40 determines whether or not the electric power converter 33 performs the electric power conversion in the series connecting mode (step S41).

As a result of the determination at the step S41, if it is determined that the electric power converter 33 does not perform the electric power conversion in the series connecting mode (namely, the electric power converter 33 performs the electric power conversion in the parallel connecting mode) (step S41: No), the ECU 40x performs the above described operation illustrated in FIG. 6.

On the other hand, as a result of the determination at the step S41, if it is determined that the electric power converter 33 performs the electric power conversion in the series connecting mode (step S41: Yes), the ECU 40x (especially, the delay adding unit 49x) determines whether or not the vehicle 1 is in the high-load driving state (step S11).

As a result of the determination at the step S11, if it is determined that the vehicle 1 is not in the high-load driving state (step S11: No), the ECU 40x (especially, the delay adding unit 49x) selects, as the delay adding manner D that is used by the delay device 491x to the delay device 494x, the delay adding manner D#2 that is capable of increasing the efficiency of the electric power conversion (step S45). The "increase of the efficiency of the electric power conversion" here means the increase from the efficiency of the electric power conversion when the delay adding manner D#1 is selected. Namely, the increase of the efficiency of the electric power conversion means a state where the efficiency of the electric power conversion when the delay adding manner D#2 is selected is equal to or larger than the efficiency of the electric power conversion when the delay adding manner D#1 is selected.

On the other hind, as a result of the determination at the step S11, if it is determined that the vehicle 1 is in the high-load driving state (step S11: No), the ECU 40x (especially, the delay adding unit 49x) selects, as the delay adding manner D that is used by the delay device 491x to the delay device 494x. The delay adding manner D#1 that is capable of suppressing the increase of the element temperature of at least one of the switching element S1 to the switching element S4 (step S42 to step S44). Especially in the fourth embodiment. The ECU 40x switches the delay adding manner D#1 that is used by the delay device 491x to the delay device 494x between the delay adding manner D#1-i (i=1, 2, 3 or 4) that is capable of suppressing the increase of the element temperature of the switching element Si and the delay adding manner D#1-j (j=1, 2, 3 or 4 and j≠i) that is capable of suppressing the increase of the element temperature of the switching element Sj every time a predetermined time elapses (step S42 to step S44).

Note that the "suppression of the increase of the element temperature of the switching element Sk" that is realized by selecting the delay adding manner D#1-k may mean the suppression of the increase from the element temperature of the switching element Sk when the delay adding manner D#1-k is not selected, in addition to or instead of meaning the suppression of the increase from the element temperature of the switching element Sk when the delay adding manner D#2 is selected.

Here, with reference to FIG. 13, a variation of each of the loss of the electric source system 30 and the element temperatures of the switching element S1 to the switching element S4 before and after the delay adding manner D#1 is switched will be described. FIG. 13 is a graph illustrating the loss of the electric source system 30, the element temperatures of the switching element S1 to (be switching element S4, the control signal SG1 to the control signal SG4, the element current SI1 to the element current SI4 that flow through the snitching element S1 to the switching element S4, respectively, and the reactor current signals I1 and I2 before and after the delay adding manner D#1 is switched.

A left side in FIG. 13 illustrate, the loss of the electric source system 30, the element temperatures of the switching element S1 to the switching element S4, the control signal SG1 to the control signal SG4, the element current SI1 to the element current SI4 and the reactor current signals I1 and I2 when the delay adding manner D#1-4 is selected. In an example illustrated in FIG. 13, the delay adding manner D#1-4 is the delay adding manner D#1 that is capable of delaying the rising edge of the control signal SG2 by a predetermined time and delay the falling edge of the controlling signal SG4 by a predetermined time. Note that a dashed line illustrated in FIG. 13 with the waveforms of the control signals SG2 and SG4 represent the wave forms of the control signals SG2 and SG4 to each of which the delay is not added.

In the case, the switching element S2, which switches from the OFF state to the ON state at the same time as the switching element S4 if the delay is not added, switches from the OFF state to the ON state after the switching element S4 has switched front the OFF state to the ON state. In the same manner, the switching element S2, which switches from the ON state to the OFF state at the same time as the switching element S4 if the delay is not added, switches from the ON state to the OFF state before the switching element S4 switches from the ON state to the OFF state. As a result, as illustrated in FIG. 13, the increase of the temperature of the switching element S4 is suppressed, compared to the case where the delay is not added to the control signals SG2 and SG4 (see the element temperature illustrated by a dashed line in FIG. 13).

A center side in FIG. 13 illustrates the loss of the electric source system 30, the element temperatures of the switching element S1 to the switching element S4, the control signal SG1 to the control signal SG4, the element current SI1 to the element current SI4 and the reactor current signals I1 and I2 when the delay adding manner D#1-2 is selected. In an example illustrated in FIG. 13, the delay adding manner D#1-2 is the delay adding manner D#1 that is capable of delaying the falling edge of the control signal SG2 by a predetermined time and delay the rising edge of the controlling signal SG4 by a predetermined time.

In this case, the switching element S2, which switches from the OFF state to the ON state at the same time as the switching element S4 if the delay is not added, switches from the OFF state to the ON state before the switching element S4 switches from the OFF state to the ON state. In the same manner, the switching element S2, which twitches from the ON state to the OFF state at the same time as the switching element S4 if the delay is not added, switches from the ON state to the OFF state after the switching element S4 has twitched from the ON state to the OFF state. As a result, as illustrated in FIG. 13, the increase of the temperature of the switching element S2 is suppressed, compared to the case where the delay is not added to the control signals SG2 and SG4 (see the element temperature illustrated by a dashed line in FIG. 13).

Here, with reference to FIG. 14(a) to FIG. 14(d), a reason why the increase of the element temperature of the switching element S2 is suppressed by selecting the delay adding manner D#1-2 and a reason why the increase of the element temperature of the switching element S4 is suppressed by selecting the delay adding manner D#1-4 will be described. FIG. 14(a) to FIG. 14(d) are circuit diagrams illustrating an electric current that flows through the electric power converter 33 when the delay adding manner D#1-2 is selected and an electric current that flows through the electric power converter 33 when the delay adding manner D#1-4 is selected.

As illustrated in FIG. 14(a), it is assumed that the electric power converter 33 is in an initial state to which the twitching element S1 is in the OFF state and the switching element S2 to the twitching element S4 are in the ON state. In this case, a second electric current that flows through an electric current path including the second electric source 32 flows as the element current SI2 through the switching element S2. A first electric current that flows through an electric current path including the first electric source 31 flows at the element current SI4 through the twitching element S4.

If the delay adding manner D#1-4 is selected in the initial state, as illustrated in FIG. 14(b), the twitching element S2 switches from the ON state to the OFF state before the switching element S4 switches from the ON state to the OFF state. As a result, a switching loss arises in the switching element S2 due to the switching of its switching state to the OFF state. Therefore, the element temperature of the switching element S2 increases relatively easily. On the other hand, not only the first electric current but also the second electric current that flows in a direction to cancel out the first electric currant flow through the switching element S4. As a result, the effective value of the element current SI4 decreases due to the cancelation of the electric currents flowing through the switching element S4. Therefore, the increase of the element temperature of the switching element S4 is suppressed.

Then, as illustrated in FIG. 14(c), the switching element S4 switches from the ON state to the OFF state after the twitching element S2 has switched from the ON state to the OFF state.

Note that same situation occurs when the switching elements S2 and S4 switch from the OFF state to the ON state, although this situation is not illustrated for the purpose of simple illustration. Namely, since the switching element S2 switches from the OFF state to the ON state after the switching element S4 has switched from the OFF state to the ON state, (i) the switching loss arises is the switching element S2 due to the switching of its switching state to the ON state and (ii) the electric currents flowing through the switching element S4 cancel out each other.

On the other hand, if the delay adding manner D#1-2 is selected in the initial state, as illustrated in FIG. 14(d). The switching element S4 switches from the ON state to the OFF state before the switching element S2 switches from the ON state to the OFF state. As a result, a switching loss arises is the switching element S4 due to the switching of its switching state to the OFF state. Therefore, the element temperature of the switching element S4 increases relatively easily. On the other hand, not only the second electric current but also the first electric current that flows in a direction to cancel out the second electric current flow through the switching element S2. As a result, the effective value of the element current SI2 decreases due to the cancelation of the electric currents flowing through the switching element S2. Therefore, the increase of the element temperature of the switching element S2 is suppressed.

Then, as illustrated in FIG. 14(c), the switching element S2 switches from the ON state to the OFF state after the switching element S4 has switched from the ON stole to the OFF state.

Note that same situation occurs when the switching elements S2 and S4 switch from the OFF state to the ON state, although this situation is not illustrated for the purpose of simple illustration. Namely, since the Switching element S4 switches from the OFF state to the ON state after the switching element S2 has switched from the OFF state to the ON state, (i) the switching loss arises in the switching element S4 due to the switching of its switching state to the ON state and (ii) the electric currents flowing through the twitching element S2 cancel out each other.

Again in FIG. 13, the ECU 40x switches the delay adding manner D#1 that is used by the delay device 491x to the delay device 494x between the delay adding manner D#1-2 and the delay adding manner D#1-4 every time the predetermined time elapses. As a result, as illustrated in a right side in FIG. 13, the control signal SG1 to the control signal SG4, the element current SI1 to the element current SI4 and the reactor current signals I1 and I2 vary after the delay adding manner D#1 is switched. However, actually, each of the element current SI1 to the element current SI4 and the reactor current signals I1 and I2 may be regarded as one that hardly vary even after the delay adding manner D#1 is switched, because the amount of the added delay is extremely small. When the delay adding manner D#1-2 is selected, the increase of the element temperature of the switching element S2 is suppressed, as described with reference to FIG. 14(a) to FIG. 14(d). When the delay adding manner D#1-4 is selected, the increase of the element temperature of the switching element S4 is suppressed, as described with reference to FIG. 14(a) to FIG. 14(d). Therefore, the increase of the element temperatures of both of the switching elements S2 and S4 is suppressed (in an example illustrated in FIG. 13, the element temperatures of both of the switching elements S2 and S4 decrease) by way of the delay adding manners D#1-2 and D#1-4 being selected alternately, compared to the case where the delay adding manner D#2 is added or the delay adding manner D#1-2 or the delay adding manner D#1-4 is kept to be added.

As described above, as in the fourth embodiment, the various effects that can be achieved in the first embodiment is achieved appropriately.

Especially in the fourth embodiment, the ECU 40x is capable of changing the switching pattern of at least one of the switching element S1 to the switching element S4 by using the method that is different from the method of changing the phase difference $\phi$ that is added to the carrier signal C. Thus, the ECU 40x it capable of changing the switching pattern of at least one of the switching element S1 to the switching element S4 even when the electric power converter 33 does not perform the electric power conversion in the parallel connecting mode. For example, the ECU 40x is capable of changing the twitching pattern of at least one of the switching element S1 to the switching element S4 even when the electric power converter 33 performs the electric power conversion in the series connecting mode.

Moreover, to the fourth embodiment, the ECU 40x is capable of switching the delay adding manner D appropriately. Therefore, the ECU 40x is capable of suppressing the increase of the element temperatures of the plurality of switching elements to some extent.

Note that the ECU 40 switches the delay adding manner D#1 that is used by the delay device 491x to the delay device 494x between the delay adding manner D#1-i and the delay adding manner D#1-j in the above described description. However, the ECU 40 may switches the delay adding manner D#1 that is used by the delay device 491x to the delay device 494x among the delay adding manner D#1-x, the delay adding manner D#1-j and the delay adding manner D#1-k (k=1, 2, 3 or 4, k≠i and k≠j) that is capable of suppressing the increase of the element temperature of the switching element Sk. The ECU 40 may switches the delay adding manner D#1 that is used by the delay device 491x to the delay device 494x among the delay adding manner D#1-1, the delay adding manner D#1-2, the delay adding manner D#1-3 and the delay adding manner D#1-4.

Moreover, the ECU 40x may add the delay to at least one of the control signal SG1 to the control signal SG4 even when the electric power converter 33 performs the electric power conversion with one of the first electric source 31 and the second electric source 32 and does not perform the electric power conversion with the other one of the first electric source 31 and the second electric source 32. As a result, the ECU 40x is capable of changing the switching pattern even when the electric power converter 33 performs the electric power conversion with one of the first electric source 31 and the second electric source 32 and does not perform the electric power conversion with the other one of the first electric source 31 and the second electric source 32.

The present invention is not limited to the shove described embodiments, but various changes may be made. If desired, without departing from the essence or spirit of the invention which can be read from the claims and the entire specification. An electric source control apparatus, which involves such changes, is also intended to be within the technical scope of the present invention.

DESCRIPTION OF REFERENCE CODES

1 vehicle
30 electric source system
31 first electric source
32 second electric source
33 electric power converter
40 ECU
45 phase difference adding unit
49x delay adding unit
491x delay controlling unit
492x delay device
493x delay device
494x delay device
495x delay device
S1, S3, S3, S4 switching element

What is claimed is:

1. An electric source control apparatus that is configured to control an electric source system,
the electric source system having:
(i) an electricity storage apparatus; and
(ii) an electric power converter that has a switching element and that is configured to perform an electric power conversion with the electricity storage apparatus by changing switching state of the switching element,
the electric source control apparatus comprising a controller,
the controller being programmed to:
determine whether the electric power converter operates in a first mode or a second mode, wherein the first mode prioritizes an increase of an efficiency of the electric power conversion than the second mode does and the second mode prioritizes a suppression of an increase of element temperature of the switching element than the first mode does; and
control the electric power converter so that (i) a switching pattern of the switching element becomes a first pattern, if it is determined that the electric power converter operates in the first mode and (ii) the switching pattern of the switching element becomes a second pattern, if it is determined that the electric power converter operates in the second mode, wherein the first pattern is capable of increasing the efficiency of the electric power conversion more than the second pattern is and the second pattern is capable of suppressing the increase of the element temperature more than the first pattern is.

2. The electric source control apparatus according to claim 1, wherein
the second pattern defines a second switching timing that is obtained by shifting, in a time axis direction, at least one portion of a first switching timing of the switching element that is defined by the first pattern.

3. The electric source control apparatus according to claim 1, wherein
The controller is programmed to determine on the basis of a load of the electric source system whether the electric power converter operates in the first mode or the second mode.

4. The electric source control apparatus according to claim 3, wherein
the controller is programmed to determine that the electric power converter operates in the first mode if the load is smaller than a predetermined value,
the controller is programmed to determine that the electric power converter operates in the second mode if the load is equal to or larger than the predetermined value.

5. The electric source control apparatus according to claim 1, wherein
the electric power converter has a plurality of switching elements,
the second mode is a mode that suppresses the increase of the element temperature of a first switching element among the plurality of switching elements.

6. The electric source control apparatus according to claim 5, wherein
the first switching element is a switching element having highest element temperature among the plurality of switching elements.

7. The electric source control apparatus according to claim 1, wherein
the electric power converter has a plurality of switching elements,
the second mode is a mode that suppresses the increase of the element temperatures of at least a first switching element and a second switching element among the plurality of switching elements.

8. The electric source control apparatus according to claim 7, wherein
the controller is programmed to control the electric power converter so that the switching pattern is switched between a third pattern and a fourth pattern, if it is determined that the electric power converter operates in the second mode, wherein (i) the third pattern is one portion of the second pattern and is capable of suppressing the increase of the element temperature of the first switching element more than the first pattern is and (ii) the fourth pattern is one portion of the second pattern and is capable of suppressing the increase of the element temperature of the second switching element more than the first pattern is.

9. The electric source control apparatus according to claim 7, wherein
the first and second switching elements are switching elements having higher element temperatures than another switching element among the plurality of switching elements.

10. The electric source control apparatus according to claim 1, wherein the electric source system has, as electricity storage apparatuses, at least a first electricity storage apparatus and a second electricity storage apparatus, (i) the electric power converter has a plurality of switching elements each of which is arranged to be included in both of a first electric power conversion path and a second electric power conversion path, wherein the first electric power conversion path is formed to pass through the first electricity storage apparatus to perform the electric power conversion with the first electricity storage apparatus and the second electric power conversion path is formed to pass through the second electricity storage apparatus to perform the electric power conversion with the second electricity storage apparatus, (ii) the electric power converter is capable of performing the electric power conversion in a state where the first electricity storage apparatus and the second electricity storage apparatus are electrically connected in parallel in the electric source system and in a state where the first electricity storage apparatus and the second electricity storage apparatus are electrically connected in series in the electric source system.

11. The electric source control apparatus according to claim 10, wherein the controller is programmed (i) to adjust a phase difference between a first carrier signal that is used by a first pulse width modulation control for controlling the electric power conversion in the first electric power path and a second carrier signal that is used by a second pulse width modulation control for controlling the electric power conversion in the second electric power path and (ii) to control the electric power converter so that the switching element is switched on the basis of a control signal that is obtained by the first pulse width modulation control and the second pulse width modulation control, the controller is programmed to adjust the phase difference so that the phase difference when it is determined that the electric power converter operates in the first mode is different from the phase difference when it is determined that the electric power converter operates in the second mode.

* * * * *